United States Patent
Lapstun

(10) Patent No.: US 8,282,016 B2
(45) Date of Patent: *Oct. 9, 2012

(54) POSITION-CODING PATTERN HAVING TAG COORDINATES ENCODED BY SUCCESSIVE SUBSEQUENCES OF CYCLIC POSITION CODE

(75) Inventor: Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 429 days.

This patent is subject to a terminal disclaimer.

(21) Appl. No.: 12/539,592

(22) Filed: Aug. 11, 2009

(65) Prior Publication Data

US 2010/0084480 A1    Apr. 8, 2010

Related U.S. Application Data

(60) Provisional application No. 61/102,299, filed on Oct. 2, 2008.

(51) Int. Cl.
*G06F 17/00* (2006.01)
*G06K 7/00* (2006.01)
*G06K 7/10* (2006.01)
*G06K 19/00* (2006.01)
*G06K 19/06* (2006.01)

(52) U.S. Cl. ........ 235/494; 235/375; 235/454; 235/487; 235/462.01

(58) Field of Classification Search .................. 235/454, 235/487, 494, 375, 462.01
See application file for complete search history.

(56) References Cited

U.S. PATENT DOCUMENTS

| | | | |
|---|---|---|---|
| 4,864,618 | A | 9/1989 | Wright et al. |
| 5,051,736 | A | 9/1991 | Bennett et al. |
| 5,477,012 | A | 12/1995 | Sekendur |
| 5,652,412 | A | 7/1997 | Lazzouni et al. |
| 5,661,506 | A | 8/1997 | Lazzouni et al. |
| 5,692,073 | A | 11/1997 | Cass |
| 5,852,434 | A | 12/1998 | Sekendur |
| 6,076,734 | A | 6/2000 | Dougherty et al. |
| 6,964,374 | B1 | 11/2005 | Djuknic et al. |
| 2004/0148558 | A1* | 7/2004 | Lapstun et al. ............... 714/781 |
| 2005/0001042 | A1* | 1/2005 | Lapstun ....................... 235/494 |

FOREIGN PATENT DOCUMENTS

| GB | 2306669 A | 5/1997 |
|---|---|---|
| WO | WO 99/18487 A2 | 4/1999 |
| WO | WO 99/50787 A1 | 10/1999 |
| WO | WO 02/084473 A1 | 10/2002 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

*Primary Examiner* — Michael G Lee
*Assistant Examiner* — Laura Gudorf

(57) ABSTRACT

A substrate having a position-coding pattern disposed on a surface thereof. The position-coding pattern comprises a plurality of tags, each tag encoding a w-bit subsequence of a cyclic code sequence having a length n and a dimension k. The w-bit subsequence maps to a corresponding coordinate codeword for the tag. Adjacent tags contain successive w-bit subsequences in the cyclic code sequence and n>w>k.

19 Claims, 21 Drawing Sheets

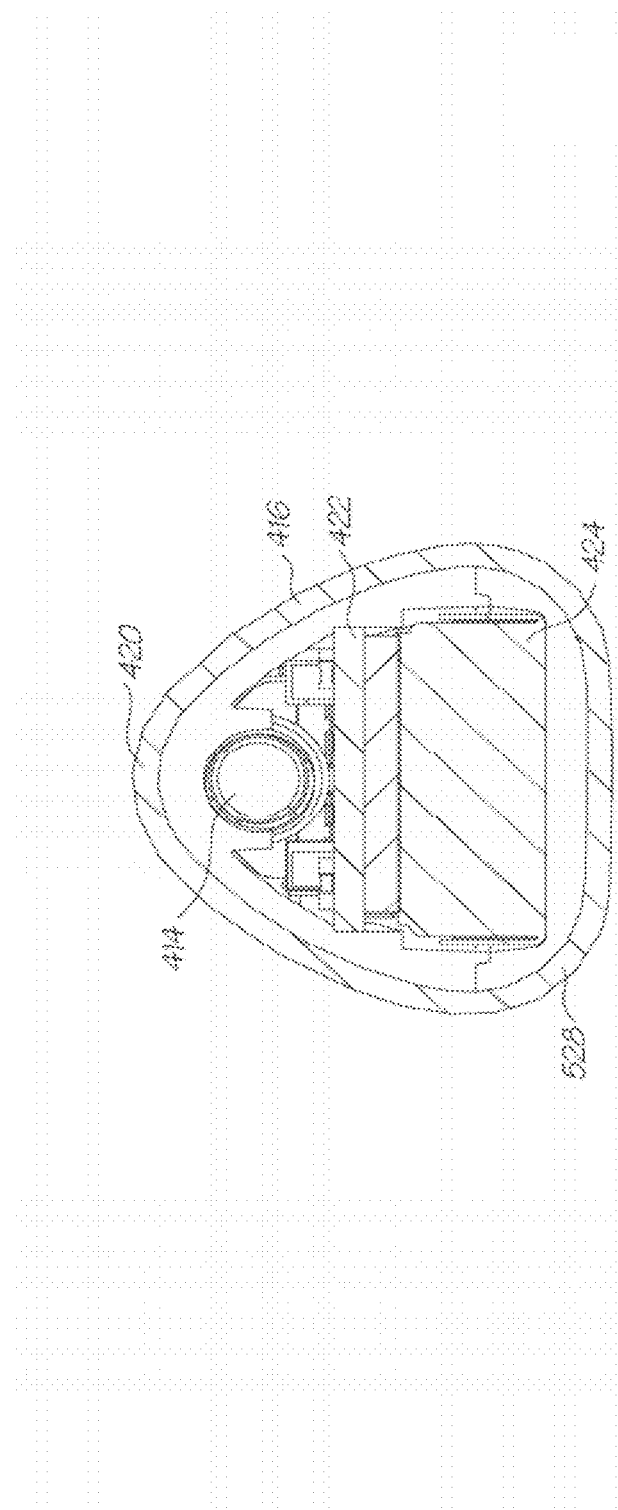
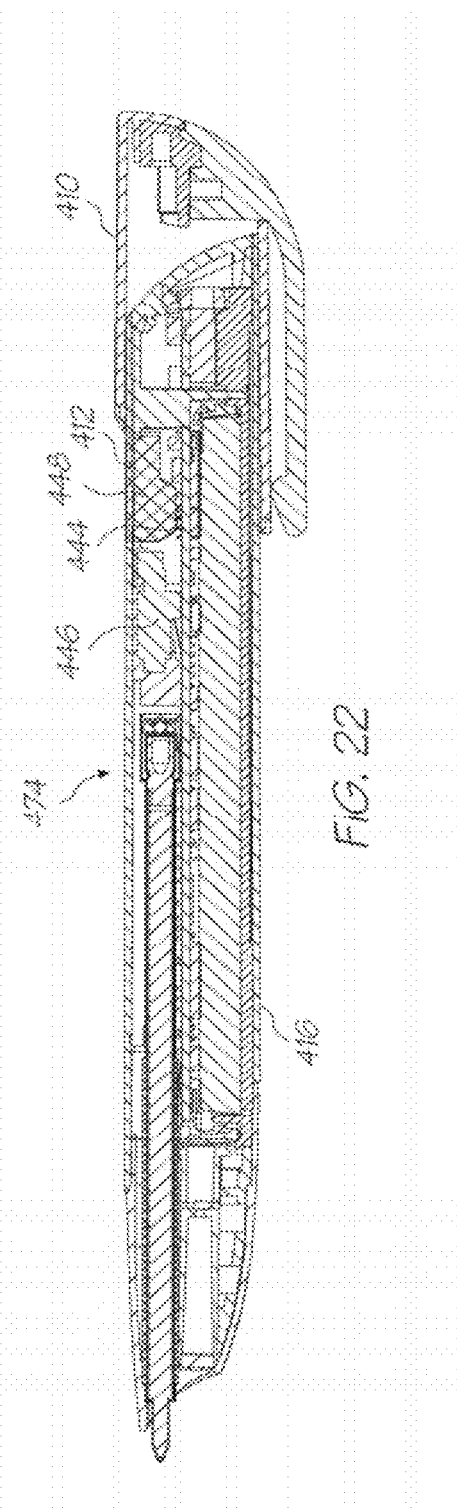

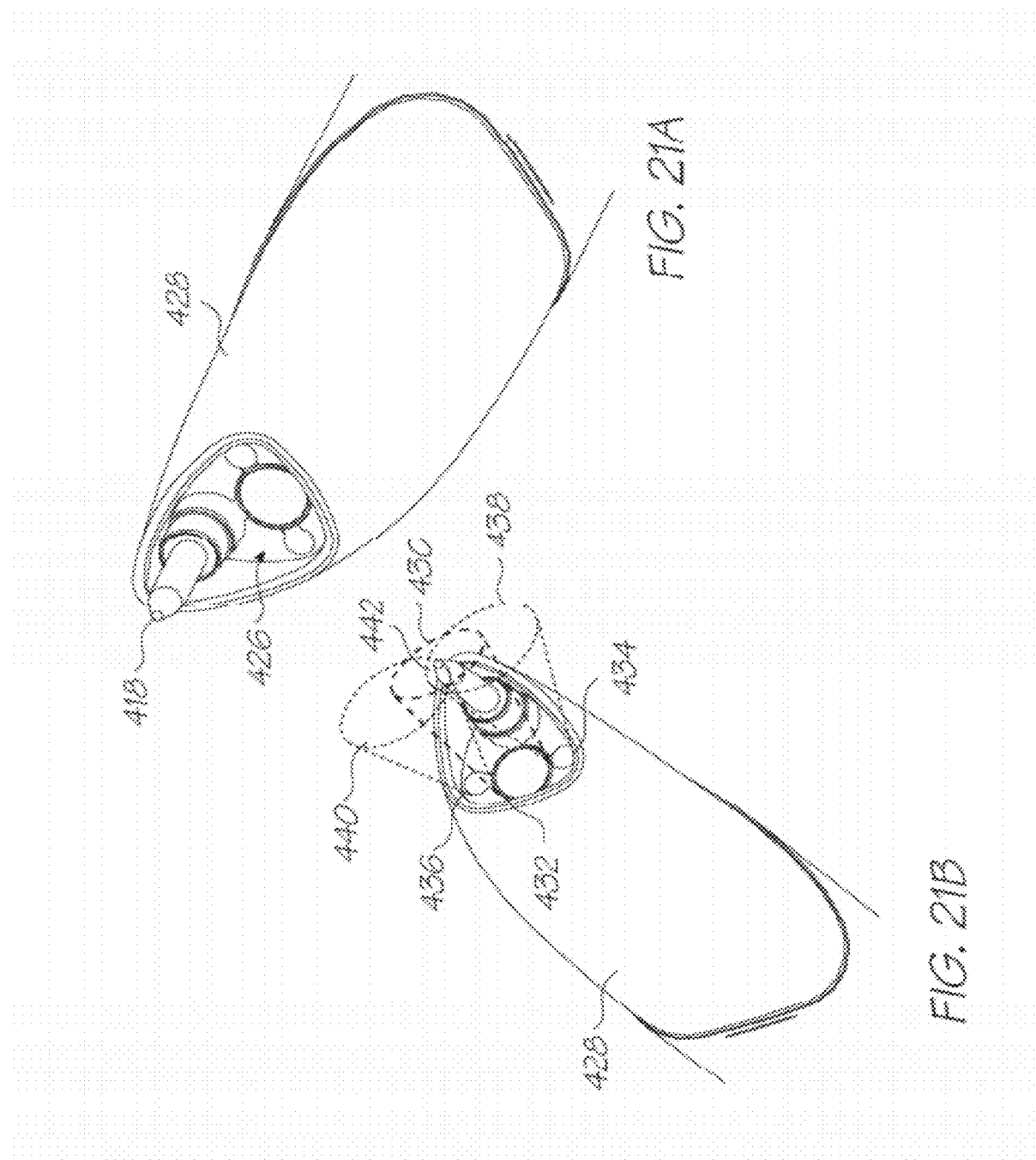

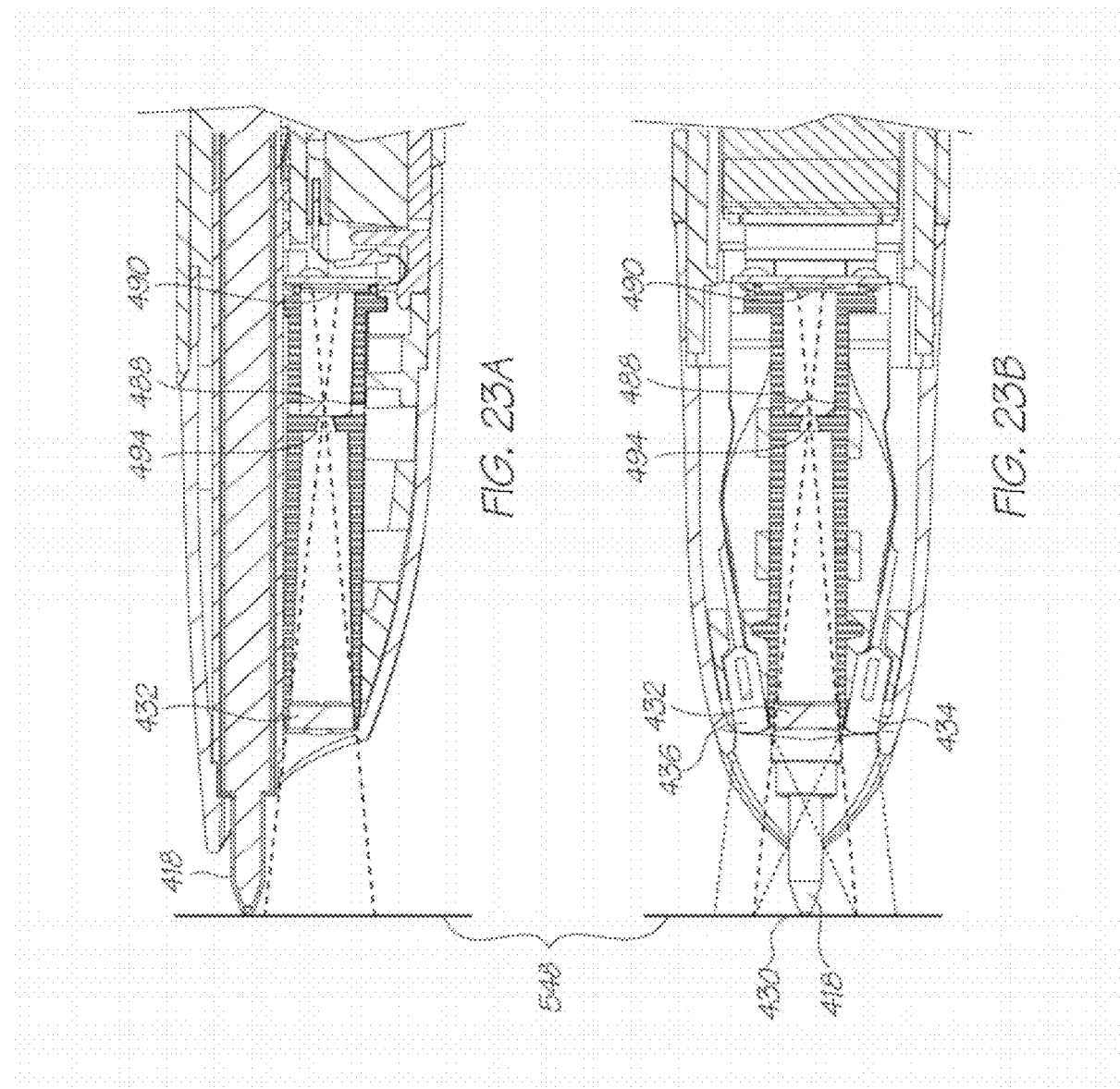

POSITION-CODING PATTERN HAVING TAG COORDINATES ENCODED BY SUCCESSIVE SUBSEQUENCES OF CYCLIC POSITION CODE

FIELD OF INVENTION

The present invention relates to a position-coding pattern on a surface.

COPENDING APPLICATIONS

The following applications have been filed by the Applicant simultaneously with the present application:

| | | |
|---|---|---|
| 12/539,588 | 12/539,589 | 12/539,597 |
| 12/539,599 | 12/539,603 | 12/539,605 |

The disclosures of these co-pending applications are incorporated herein by reference.

CROSS REFERENCES

The following patents or patent applications filed by the applicant or assignee of the present invention are hereby incorporated by cross-reference.

| | | | | | |
|---|---|---|---|---|---|
| 10/815,621 | 10/815,635 | 7,357,323 | 11/488,162 | 7,605,940 | 7,506,168 |
| 7,905,401 | 7,457,961 | 7,457,007 | 7,204,941 | 7,278,727 | 7,423,145 |
| 7,122,076 | 7,156,289 | 7,721,948 | 6,720,985 | 7,295,839 | 7,593,899 |
| 7,068,382 | 7,094,910 | 7,062,651 | 6,644,642 | 6,549,935 | 6,287,573 |
| 6,727,996 | 6,760,119 | 7,064,851 | 6,290,349 | 6,428,155 | 6,785,016 |
| 6,831,682 | 6,741,871 | 6,965,439 | 7,663,780 | 6,870,966 | 6,474,888 |
| 6,724,374 | 6,788,982 | 7,263,270 | 6,788,293 | 6,737,591 | 7,369,265 |
| 10/778,056 | 10/778,061 | 11/193,482 | 7,055,739 | 6,830,196 | 7,182,247 |
| 7,082,562 | 7,918,404 | 7,108,192 | 10/492,169 | 7,469,062 | 7,359,551 |
| 7,444,021 | 7,308,148 | 6,957,768 | 7,170,499 | 11,856,061 | 7,762,453 |
| 7,821,507 | 11,754,310 | 12,015,507 | 7,148,345 | 8,028,925 | 12,025,762 |
| 12,025,765 | 7,416,280 | 6,902,255 | 6,755,509 | 12,178,611 | 8,091,792 |

BACKGROUND

The Applicant has previously described a method of enabling users to access information from a computer system via a printed substrate e.g. paper. The substrate has a coding pattern printed thereon, which is read by an optical sensing device when the user interacts with the substrate using the sensing device. A computer receives interaction data from the sensing device and uses this data to determine what action is being requested by the user. For example, a user may make make handwritten input onto a form or make a selection gesture around a printed item. This input is interpreted by the computer system with reference to a page description corresponding to the printed substrate.

It would desirable to improve the coding pattern printed on the substrate so as to maximize usage of images captured by the sensing device, whilst still providing a robust error-correcting code. It would be further desirable to minimize visible coloration of the substrate by the coding pattern.

SUMMARY OF INVENTION

In a first aspect, there is provided a substrate having a position-coding pattern disposed on a surface thereof, the position-coding pattern comprising:

a plurality of tags, each tag encoding a w-bit subsequence of a cyclic code sequence, the w-bit subsequence mapping to a corresponding coordinate codeword for the tag, wherein adjacent tags contain w-bit subsequences shifted by one bit relative to each other in the cyclic code sequence.

An advantage of this position-pattern described in the first aspect is that it allows coordinate data to be captured by an optical reader whilst minimizing the required field of view.

Optionally, the w-bit subsequence is represented by a set of coordinate data symbols in the tag, each of the coordinate data symbols containing at least one bit of the w-bit subsequence, each coordinate data symbol being represented by one or more data elements disposed on the surface.

Optionally, the cyclic code sequence is an m-sequence or a simplex code.

Optionally, the cyclic code sequence has a length n and a dimension k, and wherein: n>w>k. The provision of n>w>k ensures that the code enables error-detection and error-correction.

Optionally, a given tag contains a w-bit subsequence corresponding to offset i in the cyclic code sequence, and adjacent tags on either side of the given tag contain w-bit subsequences corresponding to offsets (i+1) and (i−1) in the cyclic code sequence.

Optionally, the position-coding pattern comprises a plurality of target elements defining a target grid, the target grid comprising a plurality of cells, each cell defining a symbol group, wherein neighboring symbol groups share target elements.

Optionally, each tag is square and contains a plurality of symbol groups.

Optionally, each coordinate data symbol is a 1-bit symbol such that w coordinate data symbols represent the w-bit subsequence.

Optionally, the set of coordinate data symbols is arranged in each tag such that at any square portion of the position-coding pattern of length (l+q) is guaranteed to contain at least (w−1) bits of the w-bit subsequence, wherein l is a length of the tag and q is a length or a width of a coordinate data symbol.

Optionally, each tag contains an x-coordinate codeword mapped from a first cyclic code sequence and a y-coordinate codeword mapped from a second cyclic code sequence, the x-coordinate codeword being defined by a first set of x-coordinate data symbols, and the y-coordinate codeword being defined by a second set of y-coordinate data symbols.

Optionally, the first set is arranged in subsets of x-coordinate data symbols and the second set is arranged in subsets of y-coordinate data symbols.

Optionally, each subset of x-coordinate data symbols is configured as a column containing a plurality of the x-coordinate data symbols, and each subset of y-coordinate data symbols is configured as a row containing a plurality of the y-coordinate data symbols, wherein each of the rows and columns has a maximal width v.

Optionally, the columns of x-coordinate symbols and the rows of y-coordinate symbols are arranged such that any square portion of the position-coding pattern of length (l+v) is guaranteed to contain at least (w−1) bits of a w-bit subsequence in the first cyclic code sequence and at least (w−1) bits of a w-bit subsequence in the second cyclic code sequence, wherein l is a length of each tag.

Optionally, one or more of the coordinate data symbols is a merged data symbol, each merged data symbol being represented by the one or more data elements, and wherein each merged data symbol encodes at least two of:

an x-coordinate data symbol from the first set;
a y-coordinate data symbol from the second set; and
at least one further data symbol which is different from the x- and y-coordinate data symbols.

Optionally, the at least one further data symbol is a Reed-Solomon symbol defining a fragment of a common codeword, the common codeword being encoded by a set of Reed-Solomon symbols contained in the tag, the common codeword identifying an identity common to a plurality of contiguous tags, Optionally, each merged data symbol is represented by the one or more data elements using pulse position modulation.

Optionally, the data elements are macrodots (e.g. optically readable marks in the form of dots), and wherein each merged data symbol is represented by m macrodots, each of the macrodots occupying a respective position from a plurality of predetermined possible positions p within the merged data symbol, the respective positions of the macrodots representing one of a plurality of possible data values, wherein m is an integer value of 1 or more, and p>m. For example, m may be 1, 2, 3, 4, 5, 6 or 7 and p may be 2, 3, 4, 5, 6, 7, 8, 9, 10, 11, 12, 13, 14, 15 or 16.

Encoding by multi-PPM in this way ensures uniform coverage of the substrate with macrodots, which helps to reduce visibility. Moreover, PPM encoding provides an internal luminescence reference for reading macrodots. For example, the darkest m macrodots in the p positions are taken to be the PPM data, without the need to refer to any external luminescence threshold value.

Optionally, each merged data symbol encodes the x-coordinate data symbol and the y-coordinate data symbol.

Optionally, the x-coordinate data symbols and the y-coordinate data symbols are contained in different merged symbols.

Optionally, one or more of the coordinate data symbols is a merged data symbol, each merged data symbol being represented by the one or more data elements, and wherein each merged data symbol encodes at least one of the coordinate data symbols and at least one further data symbol which is different from the coordinate data symbol.

In a second aspect, there is provided a method of decoding a position-coding pattern disposed on a surface of a substrate, the method comprising the steps of:
(a) operatively positioning an optical reader relative to the surface and capturing an image of a portion of the coding pattern, the coding pattern comprising:
a plurality of tags, each tag encoding a w-bit subsequence of a cyclic code sequence, the w-bit subsequence mapping to a corresponding coordinate codeword for the tag, wherein adjacent tags contain w-bit subsequences shifted by one bit relative to each other in the cyclic code sequence;
(b) sampling a windowed subsequence contained in the imaged portion;
(c) identifying a coordinate codeword using the windowed subsequence; and
(d) determining a position of the optical reader from the coordinate codeword
wherein the imaged portion has a diameter of more than one tag diameter and less than two tag diameters.

Optionally, the windowed subsequence contains a first subsequence from at least one first tag and a second subsequence from at least one second tag, the first and second tags being adjacent to each other, and wherein the method comprises the step of:
combining the first and second subsequences; and
using the combined first and second subsequences to identify the coordinate codeword.

Thus, the first and second subsequences are usually derived from 2 or more adjacent tags (e.g. 4 tags arranged in a square comprising two first tags and two second tags). Since coordinate codeword (and the coordinate) is derivable from portions of tags, the length n of the underlying code can be made relatively short and the field of view of the optical reader can be minimized.

Optionally, if the combined first and second subsequences does not map to a valid coordinate codeword, the method comprises the step of:
determining a corresponding maximally likely coordinate from the combined first and second subsequences.

Optionally, the imaged portion has a diameter of at least $(l+q)\sqrt{2}$ and spans across parts of at least first and second adjacent tags, a set of coordinate data symbols being arranged in each tag such that the windowed subsequence contained in the imaged portion is guaranteed to contain at least $(w-1)$ bits of a w-bit subsequence, the method further comprising the step of:
combining a first subsequence from at least one first tag with a second subsequence from at least one second tag to retrieve at least $(w-1)$ bits of the w-bit subsequence,
wherein l is a length of the tag and q is a length or a width of a coordinate data symbol.

Optionally, the windowed subsequence contains only $(w-1)$ bits of the w-bit subsequence, and the method further comprises the step of:
determining a maximally likely coordinate corresponding to the windowed subsequence.

Optionally, the imaged portion has a diameter of at least $(l+v)\sqrt{2}$ and spans across parts of a plurality of adjacent tags, the columns of x-coordinate symbols and the rows of y-coordinate symbols being arranged such the windowed subsequence contained in the imaged portion is guaranteed to contain at least $(w-1)$ bits of a w-bit subsequence in the first cyclic code sequence and at least $(w-1)$ bits of a w-bit subsequence in the second cyclic code sequence, the method further comprising at least one step selected from the steps of:
combining subsequences from adjacent tags in at least one row of tags to retrieve at least $(w-1)$ bits of the w-bit subsequence in the first cyclic code sequence; and
combining subsequences from adjacent tags in at least one column of tags to retrieve at least $(w-1)$ bits of the w-bit subsequence in the second cyclic code sequence,
wherein l is a length of each tag.

In a third aspect, there is provided an optical reader configured for decoding a position-coding pattern disposed on a surface of a substrate, the coding pattern comprising:
a plurality of tags, each tag encoding a w-bit subsequence of a cyclic code sequence, the w-bit subsequence mapping to a corresponding coordinate codeword for the tag, wherein adjacent tags contain a w-bit subsequence shifted by one bit relative to each other in the cyclic code sequence;
the optical reader comprising:
means for accessing the cyclic code sequence;
an image sensor for capturing an image of a portion of the position-coding pattern, the image sensor having a field-of-view of more than one tag diameter and less than two tag diameters; and
a processor configured for performing the steps of:
(i) sampling a windowed subsequence contained in the imaged portion;
(ii) accessing the cyclic code sequence and comparing the windowed subsequence with the accessed cyclic code sequence;
(iii) identifying a coordinate codeword using the windowed subsequence; and
(iv) determining a position of the optical reader from the coordinate codeword.

In a fourth aspect, there is provided a system for decoding a position-coding pattern disposed on a surface of a substrate, the system comprising:

(A) the substrate, wherein the position-coding pattern comprises:
a plurality of tags, each tag encoding a w-bit subsequence of a cyclic code sequence, the w-bit subsequence mapping to a corresponding coordinate codeword for the tag, wherein adjacent tags contain a w-bit subsequence shifted by one bit relative to each other in the cyclic code sequence; and (B) an optical reader comprising:
means for accessing the cyclic code sequence;
an image sensor for capturing an image of a portion of the position-coding pattern, the image sensor having a field-of-view of more than one tag diameter and less than two tag diameters; and
a processor configured for performing the steps of:
(i) sampling a windowed subsequence contained in the imaged portion;
(ii) accessing the cyclic code sequence and comparing the windowed subsequence with the accessed cyclic code sequence;
(iii) identifying a coordinate codeword using the windowed subsequence; and
(iv) determining a position of the optical reader from the coordinate codeword.

It will be understood that, where applicable, optional embodiments of the first aspect may also be optional embodiments of the second, third and/or fourth aspects.

In a fifth aspect, there is provided a substrate having a position-coding pattern disposed on a surface thereof, the position-coding pattern comprising:
a plurality of tags, each tag encoding a w-bit subsequence of a cyclic code sequence having a length n and a dimension k, the w-bit subsequence mapping to a corresponding coordinate codeword for the tag,
wherein adjacent tags contain successive w-bit subsequences in the cyclic code sequence, and wherein n>w>k.

Optionally, the w-bit subsequence is represented by a set of coordinate data symbols in the tag, each of the coordinate data symbols containing at least one bit of the w-bit subsequence, each coordinate data symbol being represented by one or more data elements disposed on the surface.

Optionally, the cyclic code sequence is an m-sequence or a simplex code.

Optionally, the length n of the cyclic code sequence is defined as: $n=2^k-1$.

Optionally, a given tag contains a w-bit subsequence corresponding to offset i in the cyclic code sequence, and adjacent tags on either side of the given tag contain w-bit subsequences corresponding to offsets (i+w) and (i−w) in the cyclic code sequence.

Optionally, the set of coordinate data symbols is arranged in each tag such that at any square portion of the position-coding pattern of length (l+q) is guaranteed to contain a w-bit subsequence of the cyclic code sequence, the w-bit subsequence mapping to a coordinate codeword, wherein l is a length of the tag and q is a length or a width of a coordinate data symbol.

Optionally, columns of x-coordinate symbols and rows of y-coordinate symbols are arranged such that any square portion of the position-coding pattern of length (l+v) is guaranteed to contain a w-bit subsequence of the first cyclic code sequence and a w-bit subsequence of the second cyclic code sequence, each w-bit subsequence corresponding to an offset in its respective first or second cyclic code sequence, each w-bit subsequence mapping to at least one of:

a coordinate codeword for a tag; and
a coordinate codeword for a row or column within the tag, wherein l is a length of the tag.

Optionally, one or more of the coordinate data symbols is a merged data symbol, each merged data symbol being represented by the one or more data elements, and wherein each merged data symbol encodes at least two of:
an x-coordinate data symbol from the first set;
a y-coordinate data symbol from the second set; and
at least one further data symbol which is different from the x- and y-coordinate data symbols.

In a sixth aspect, there is provided a method of decoding a position-coding pattern disposed on a surface of a substrate, the method comprising the steps of:

(a) operatively positioning an optical reader relative to the surface and capturing an image of a portion of the coding pattern, the coding pattern comprising:
a plurality of tags, each tag encoding a w-bit subsequence of a cyclic code sequence having a length n and a dimension k, the w-bit subsequence mapping to a corresponding coordinate codeword for the tag,
wherein adjacent tags contain successive w-bit subsequences in the cyclic code sequence;

(b) sampling a windowed subsequence contained in the imaged portion; and (c) identifying a coordinate codeword corresponding to the windowed subsequence; and (d) determining a position of the optical reader from the coordinate codeword,
wherein the imaged portion has a diameter of more than one tag diameter and less than two tag diameters, and wherein n>w>k.

Optionally, the windowed subsequence contains a first subsequence from at least one first tag and a second subsequence from at least one second tag, the first and second tags being adjacent to each other, and wherein the method comprises the step of:
combining the first and second subsequences; and
using the combined first and second subsequences to identify the coordinate codeword.

Optionally, if the combined first and second subsequences does not map to a valid coordinate codeword, the method comprise the step of:
determining a corresponding maximally likely valid coordinate from the combined first and second subsequences.

Optionally, the imaged portion has a diameter of at least $(l+q)\sqrt{2}$ and spans across parts of at least first and second adjacent tags, a set of coordinate data symbols being arranged in each tag such that the windowed subsequence contained in the imaged portion is guaranteed to contain a w-bit subsequence of the cyclic code sequence, the method further comprising the step of:
combining a first subsequence from at least one first tag with a second subsequence from at least one second tag to retrieve the w-bit subsequence,
wherein l is a length of the tag and q is a length or a width of a coordinate data symbol.

Optionally, the method further comprises the step of: mapping the w-bit subsequence to a coordinate.

Optionally, each tag contains an x-coordinate codeword mapped from a first cyclic code sequence and a y-coordinate codeword mapped from a second cyclic code sequence, the x-coordinate codeword being defined by a first set of x-coordinate data symbols, and the y-coordinate codeword being defined by a second set of y-coordinate data symbols.

Optionally, the first set is arranged in subsets of x-coordinate data symbols and the second set is arranged in subsets of y-coordinate data symbols.

Optionally, each subset of x-coordinate data symbols is configured as a column containing a plurality of the x-coordinate data symbols, and each subset of y-coordinate data symbols is configured as a row containing a plurality of the y-coordinate data symbols, wherein each of the rows and columns has a maximal width v.

Optionally, the imaged portion has a diameter of at least (l+v)√2 and spans across parts of a plurality of adjacent tags, the columns of x-coordinate symbols and the rows of y-coordinate symbols being arranged such the windowed subsequence contained in the imaged portion is guaranteed to a w-bit subsequence in the first cyclic code sequence and a w-bit subsequence in the second cyclic code sequence, the method further comprising at least one step selected from the steps of:

combining subsequences from adjacent tags in at least one row of tags to retrieve the w-bit subsequence in the first cyclic code sequence; and combining subsequences from adjacent tags in at least one column of tags to retrieve the w-bit subsequence in the second cyclic code sequence, wherein l is a length of each tag.

In a seventh aspect, there is provided an optical reader configured for decoding a position-coding pattern disposed on a surface of a substrate, the coding pattern comprising:

a plurality of tags, each tag encoding a w-bit subsequence of a cyclic code sequence, the w-bit subsequence mapping to a corresponding coordinate codeword for the tag, wherein adjacent tags contain successive w-bit subsequences in the cyclic code sequence;

the optical reader comprising:
   means for accessing the cyclic code sequence;
   an image sensor for capturing an image of a portion of the position-coding pattern, the image sensor having a field-of-view of more than one tag diameter and less than two tag diameters; and
   a processor configured for performing the steps of:
      (i) sampling a windowed subsequence contained in the imaged portion;
      (ii) accessing the cyclic code sequence and comparing the windowed subsequence with the accessed cyclic code sequence;
      (iii) identifying a coordinate codeword using the windowed subsequence; and
      (iv) determining a position of the optical reader from the coordinate codeword.

Optionally, the imaged portion spans across parts of at least first and second adjacent tags such that the windowed subsequence contains a first subsequence from at least one first tag and a second subsequence from at least one second tag, wherein the processor is further configured for:

combining the first and second subsequences; and using the combined first and second subsequences to identify the coordinate codeword.

In an eighth aspect, there is provided a system for decoding a position-coding pattern disposed on a surface of a substrate, the system comprising:

(A) the substrate, wherein the position-coding pattern comprises:
   a plurality of tags, each tag encoding a w-bit subsequence of a cyclic code sequence, the w-bit subsequence mapping to a corresponding coordinate codeword for the tag,
   wherein adjacent tags contain successive w-bit subsequences in the cyclic code sequence; and (B) an optical reader comprising:
   means for accessing the cyclic code sequence;
   an image sensor for capturing an image of a portion of the position-coding pattern, the image sensor having a field-of-view of more than one tag diameter and less than two tag diameters; and
   a processor configured for performing the steps of:
      (i) sampling a windowed subsequence contained in the imaged portion;
      (ii) accessing the cyclic code sequence and comparing the windowed subsequence with the accessed cyclic code sequence;
      (iii) identifying a coordinate codeword using the windowed subsequence; and
      (iv) determining a position of the optical reader from the coordinate codeword.

It will be appreciated that optional embodiments of the fifth aspect may also be optional embodiments of the sixth, seventh and/or eighth aspects. Equally, some generic features of the first aspect may be used in combination with the fifth, sixth, seventh and/or eighth aspects.

In a ninth aspect, there is provided a substrate having a coding pattern disposed on a surface thereof, the coding pattern comprising a plurality of merged data symbols, each merged data symbol being represented by a plurality of data elements disposed on the surface, wherein each merged data symbol encodes at least a first individual data symbol and a second individual data symbol.

An advantage of the ninth aspect is that the merged data symbols occupy a minimal area of the surface and minimize visible coloration of the surface compared with separately disposed first and second individual data symbols.

Optionally, the first and second individual data symbols are different from each other.

Optionally, each merged data symbol encodes a first data symbol from a first codeword and a second data symbol from a second codeword.

Optionally, each merged data symbol encodes a coordinate data symbol from a coordinate codeword and a common data symbol from a common codeword.

Optionally, each merged data symbol encodes an x-coordinate data symbol from an x-coordinate codeword, a y-coordinate data symbol from a y-coordinate codeword and a common data symbol from a common codeword.

Optionally, the common codeword encodes information common to an extended region of the surface, wherein the information is selected from the group consisting of: a region identity, an encoding format, a region flag, a pattern scale identifier and a CRC.

Optionally, the first and second individual data symbols are symbols from different error-correcting codes.

Optionally, the different error-correcting codes are selected from the group consisting of: Reed-Solomon codes, binary codes, simplex codes and cyclic position codes.

Optionally, the cyclic position codes use a cyclic code sequence, and wherein a w-bit subsequence of the cyclic code sequence defines a codeword.

Optionally, the cyclic code sequence is an m-sequence or a simplex code.

Optionally, the cyclic code sequence has a length n and a dimension k, and wherein: $n > w \geq k$.

Optionally, the w-bit subsequence of the cyclic code sequence defines a coordinate codeword.

Optionally, each merged data symbol in a set of the merged data symbols encodes a coordinate data symbol from the coordinate codeword, each coordinate data symbol encoding one bit of the w-bit subsequence.

Optionally, the merged data symbol further encodes a multi-bit Reed-Solomon symbol from a Reed-Solomon common codeword.

Optionally, wherein each merged data symbol is represented by the data elements using pulse position modulation (PPM).

Optionally, the data elements are macrodots, and wherein each merged data symbol is represented by m macrodots, each of the macrodots occupying a respective position from a plurality of predetermined possible positions p within the merged data symbol, the respective positions of the macrodots representing one of a plurality of possible data values, wherein m is an integer value of 1 or more, and p>m. For example, m may be 1, 2, 3, 4, 5, 6 or 7 and p may be 1, 2, 3, 4, 5, 6, 7, 8, 9, 10, 11, 12, 13, 14, 15 or 16.

Optionally, the coding pattern comprises a plurality of target elements defining a target grid, the target grid comprising a plurality of cells, each cell defining a symbol group containing one or more of the merged data symbols, wherein neighboring symbol groups share target elements.

Optionally, the coding pattern comprises a plurality of tags, each tag being square and comprising $M^2$ symbol groups, each symbol group containing R symbols.

Optionally, a tag encoding strategy for each tag is in accordance with a tag encoding strategy (1) to (4) described in Table A:

| tag encoding strategy | tag configuration ($M^2 \times R$) = No. of merged symbols per tag | PPM encoding (m-pPPM) | merged symbol size | coordinate codeword symbol size | common codeword symbol size | available data capacity per tag |
|---|---|---|---|---|---|---|
| (1) | $2^2 \times 8 = 32$ | 2-9PPM | 5b | 1b | 4b | 160b |
| (2) | $2^2 \times 8 = 32$ | 3-9PPM | 6b | 1b | 5b | 192b |
| (3) | $3^2 \times 8 = 72$ | 2-9PPM | 5b | 1b | 4b | 360b |
| (4) | $3^2 \times 8 = 72$ | 3-9PPM | 6b | 1b | 5b | 432b |

Optionally, a codeword configuration for each of the tag encoding strategies (1) to (4) is in accordance with one of the codeword configurations described in Table B:

| tag encoding strategy | Coordinate Codeword Configuration(s) for each tag encoding strategy | | | Common Codeword Configuration(s) for each tag encoding strategy | | |
|---|---|---|---|---|---|---|
| | Coordinate codewords per tag | Cyclic Code | total data capacity of coordinate codewords | Common codewords per tag | Reed-Solomon Code | total data capacity of coordinate codeword(s) |
| (1) | 2 (X, Y) | (16, 8) | 2 × 8 × 1b = 16b | 2 (A, B) | (15, 7) | 2 × 7 × 4b = 56b |
| (2) | 2 (X, Y) | (16, 8) | 2 × 8 × 1b = 16b | 2 (A, B) | (16, 8) | 2 × 8 × 5b = 80b |
| | 2 (X, Y) | (16, 8) | 2 × 8 × 1b = 16b | 1 (A) | (31, 23) | 1 × 23 × 5b = 115b |
| | 2 (X, Y) | (32, 16) | 2 × 16 × 1b = 32b | 2 (A, B) | (15, 7) | 2 × 7 × 4b = 56b |
| (3) | 2 (X, Y) | (36, 20) | 2 × 20 × 1b = 40b | 4 (A, B, C, D) + 1 (E) | (15, 7) (12, 4) | (4 × 7 × 4b) + (1 × 4 × 4b) = 128b |
| (4) | 2 (X, Y) | (36, 20) | 2 × 20 × 1b = 40b | 4 (A, B, C, D) | (18, 10) | 4 × 10 × 5b = 200b |
| | 2 (X, Y) | (36, 20) | 2 × 20 × 1b = 40b | 3 (A, B, C) | (24, 16) | 3 × 16 × 5b = 240b |
| | 2 (X, Y) | (36, 20) | 2 × 20 × 1b = 40b | 2 (A, B) | (31, 23) | 2 × 23 × 5b = 230b |

In a tenth aspect, there is provided a method of decoding a coding pattern disposed on a surface of a substrate, the method comprising the steps of:

(a) operatively positioning an optical reader relative to the surface and capturing an image of a portion of the coding pattern, the coding pattern comprising:
a plurality of merged data symbols, each merged data symbol being represented by a plurality of data elements disposed on the surface, wherein each merged data symbol encodes a first individual data symbol from a first codeword and a second individual data symbol from a second codeword;

(b) sampling a set of the merged data symbols contained in the imaged portion; and (c) decoding the sampled set of merged data symbols to obtain the first codeword encoded by a corresponding set of first individual data symbols.

Optionally, the method further comprises the step of:
decoding the sampled set of merged data symbols to obtain a second codeword encoded by a corresponding set of second individual data symbols.

Optionally, the method further comprises the step of:
detecting at least one erroneous first individual data symbol in the first codeword; and
treating a second individual data symbol co-encoded with the erroneous first individual data symbol as an erasure.

Hence, decoding of the first individual data symbols may assist in detecting errors in the second individual data symbols co-encoded with the first individual data symbols, and vice versa.

Optionally, the first codeword is a common codeword identifying information common to an extended region of the surface.

Optionally, the second codeword is a coordinate codeword.

Optionally, each merged data symbol encodes a third individual data symbol, and the method further comprises the step of:
decoding the sampled set of merged data symbols to obtain a third codeword encoded by a corresponding set of third individual data symbols.

In an eleventh aspect, there is provided an optical reader configured for decoding a coding pattern disposed on a surface of a substrate, the coding pattern comprising:
a plurality of merged data symbols, each merged data symbol being represented by a plurality of data elements disposed on the surface, wherein each merged data symbol encodes a first individual data symbol from a first codeword and a second individual data symbol from a second codeword;
the optical reader comprising:
an image sensor for capturing an image of a portion of the coding pattern; and
a processor configured for performing the steps of:
(i) sampling a set of the merged data symbols contained in the imaged portion; and
(ii) decoding the sampled set of merged data symbols to obtain the first codeword encoded by a corresponding set of first individual data symbols.

Optionally, the processor is further configured for:
decoding the set plurality of merged data symbols to obtain a second codeword encoded by a corresponding set of second individual data symbols.

Optionally, the processor is further configured for:
detecting at least one erroneous first individual data symbol in the first codeword; and
treating a second individual data symbol co-encoded with the erroneous first individual data symbol as an erasure.

In a twelfth aspect, there is provided a system for decoding a coding pattern disposed on a surface of a substrate, the system comprising:

(A) the substrate, wherein the coding pattern comprises:
a plurality of merged data symbols, each merged data symbol being represented by a plurality of data elements disposed on the surface, wherein each merged data symbol encodes a first individual data symbol from a first codeword and a second individual data symbol from a second codeword;

(B) an optical reader comprising:
an image sensor for capturing an image of a portion of the coding pattern; and
a processor configured for performing the steps of:
(i) sampling a set of the merged data symbols contained in the imaged portion; and
(ii) decoding the sampled set of merged data symbols to obtain the first codeword encoded by a corresponding set of first individual data symbols;
(iii) detecting at least one erroneous first individual data symbol in the first codeword;
(iv) treating a second individual data symbol co-encoded with the erroneous first individual data symbol as an erasure; and
(v) decoding the sampled set of merged data symbols to obtain a second codeword encoded by a corresponding set of second individual data symbols including the erasure.

In a thirteenth aspect, there is provided a method of encoding a coding pattern for disposition on a surface of a substrate, the method comprising the step of:
co-encoding, in a merged data symbol, a first individual data symbol from a first codeword with at least a second individual data symbol from a second codeword,
wherein the merged data symbol is represented on the surface by a plurality of data elements disposed thereon.

The method of thirteenth aspect may advantageously minimize a number of the data elements disposed on the surface.

The method of thirteenth aspect may advantageously minimize visible coloration of the surface.

Optionally, the merged data symbol is represented by the data elements using pulse position modulation (PPM) as described above.

Optionally, the coding pattern comprises a plurality of the merged data symbols.

Optionally, the method further comprises the step of printing the merged data symbol onto the surface.

Optionally, each merged data symbol encodes a coordinate data symbol from a coordinate codeword and a common data symbol from a common codeword.

Optionally, each merged data symbol encodes an x-coordinate data symbol from an x-coordinate codeword, a y-coordinate data symbol from a y-coordinate codeword and a common data symbol from a common codeword.

Optionally, the first and second individual data symbols are symbols from different error-correcting codes.

It will be appreciated that optional embodiments of the ninth aspect may also be optional embodiments of the tenth, eleventh, twelfth and thirteenth aspects.

BRIEF DESCRIPTION OF DRAWINGS

Preferred and other embodiments of the invention will now be described, by way of non-limiting example only, with reference to the accompanying drawings, in which:

FIG. 20 is a lateral cross section through the pen;

FIG. 21A is a bottom and nib end partial perspective of the pen;

FIG. 21B is a bottom and nib end partial perspective with the fields of illumination and field of view of the sensor window shown in dotted outline;

FIG. 22 is a longitudinal cross section of the pen;

FIG. 23A is a partial longitudinal cross section of the nib and barrel molding;

FIG. 23B is a partial longitudinal cross section of the IR LED's and the barrel molding;

DETAILED DESCRIPTION OF PREFERRED AND OTHER EMBODIMENTS 1.1 Netpage System Architecture In a preferred embodiment, the invention is configured to work with the netpage networked computer system, an overview of which follows. In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device (or reader) and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). References herein to "pen" or "netpage pen" are provided by way of example only. It will, of course, be appreciated that the pen may take the form of any of the sensing devices or readers described herein.

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

Figure 1:
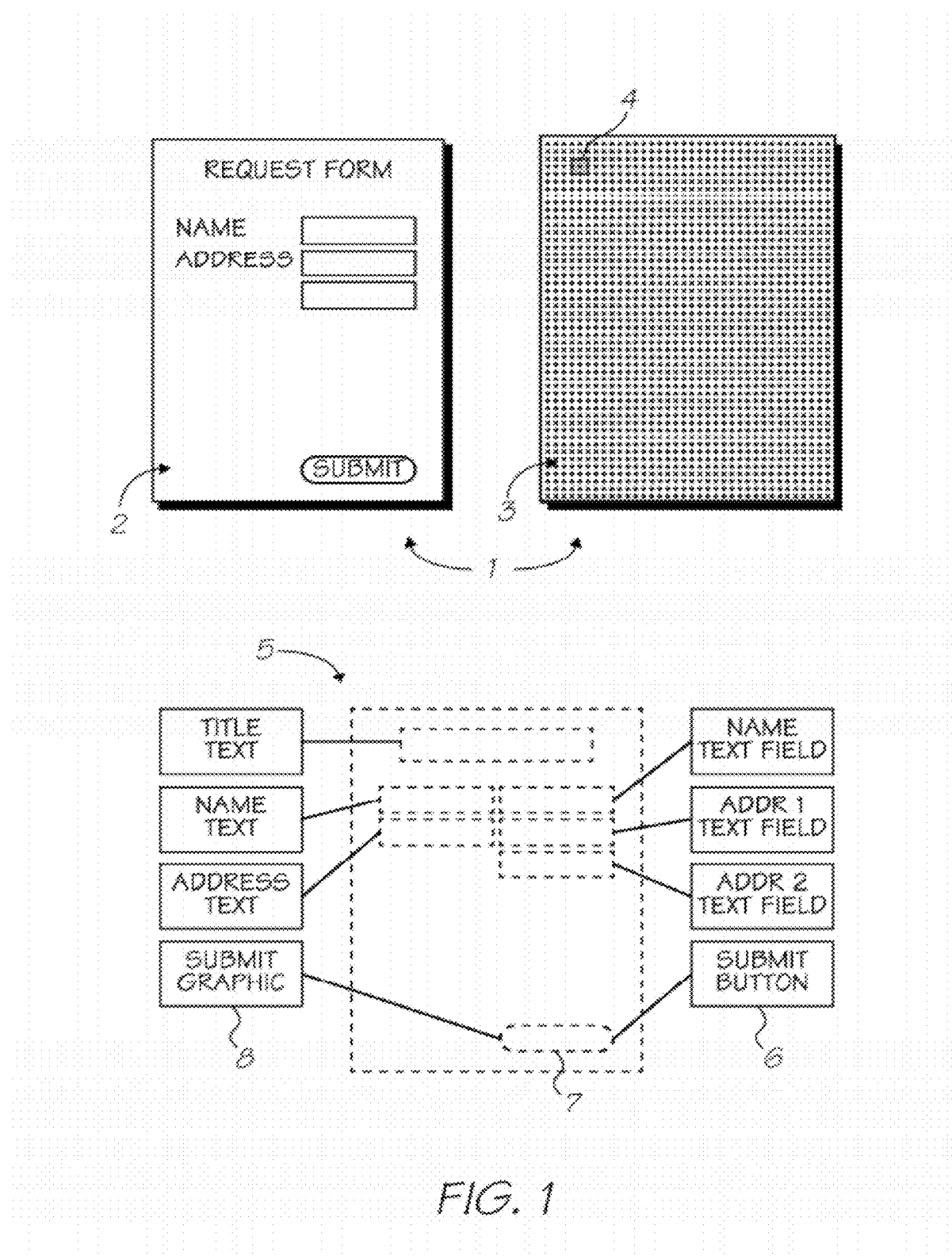
FIG. 1 is a schematic of a relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage 1 consists of graphic data 2, printed using visible ink, and a surface coding pattern 3 superimposed with the graphic data. The surface coding pattern 3 comprises a collection of tags 4. A typical tag 4 is shown in the shaded region of FIG. 1, although it will be appreciated that contiguous tags 4, defined by the coding pattern 3, are densely tiled over the whole netpage 1.

The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
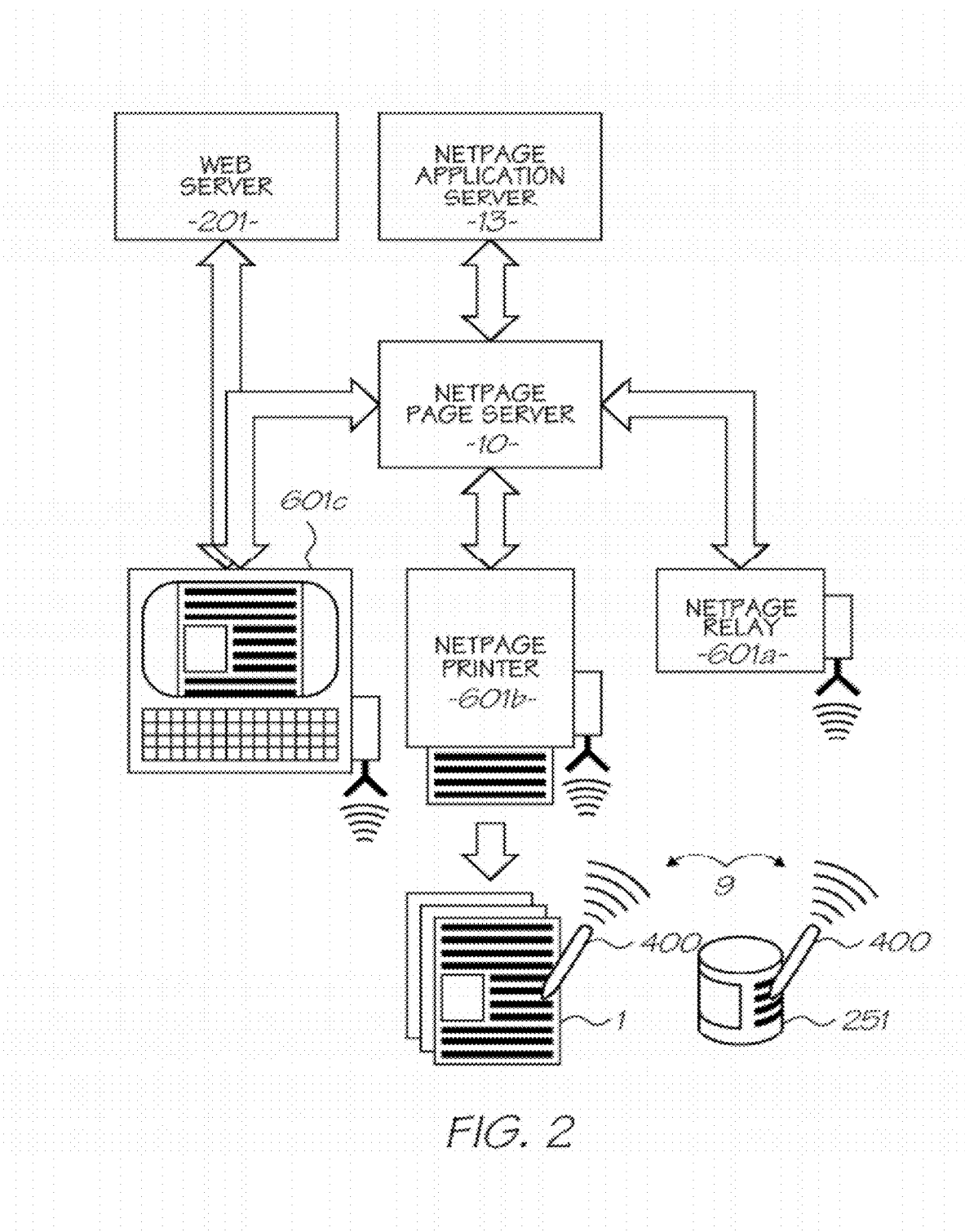
FIG. 2 shows an embodiment of basic netpage architecture with various alternatives for the relay device.

As illustrated in FIG. 2, a netpage sensing device 400, such as the pen described in Section 3, works in conjunction with a netpage relay device 601, which is an Internet-connected device for home, office or mobile use. The pen 400 is wireless and communicates securely with the netpage relay device 601 via a short-range radio link 9. In an alternative embodiment, the netpage pen 400 utilises a wired connection, such as a USB or other serial connection, to the relay device 601.

The relay device 601 performs the basic function of relaying interaction data to a page server 10, which interprets the interaction data. As shown in FIG. 2, the relay device 601 may, for example, take the form of a personal computer 601*a*, a netpage printer 601*b* or some other relay 601*c* (e.g. personal computer or mobile phone incorporating a web browser).

The netpage printer 601*b* is able to deliver, periodically or on demand, personalized newspapers, magazines, catalogs, brochures and other publications, all printed at high quality as interactive netpages. Unlike a personal computer, the netpage printer is an appliance which can be, for example, wallmounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 2, the netpage sensing device 400 interacts with a portion of the tag pattern on a printed netpage 1, or other printed substrate such as a label of a product item 251, and communicates, via a short-range radio link 9, the interaction to the relay device 601. The relay 601 sends corresponding interaction data to the relevant netpage page server 10 for interpretation. Raw data received from the sensing device 400 may be relayed directly to the page server 10 as interaction data. Alternatively, the interaction data may be encoded in the form of an interaction URI and transmitted to the page server 10 via a user's web browser 601c. The web browser 601c may then receive a URI from the page server 10 and access a webpage via a webserver 201. In some circumstances, the page server 10 may access application computer software running on a netpage application server 13.

The netpage relay device 601 can be configured to support any number of sensing devices, and a sensing device can work with any number of netpage relays. In the preferred implementation, each netpage sensing device 400 has a unique identifier. This allows each user to maintain a distinct profile with respect to a netpage page server 10 or application server 13.

Digital, on-demand delivery of netpages 1 may be performed by the netpage printer 601b, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

1.2 Netpages

Netpages are the foundation on which a netpage network is built. They provide a paper-based user interface to published information and interactive services.

As shown in FIG. 1, a netpage consists of a printed page (or other surface region) invisibly tagged with references to an online description 5 of the page. The online page description 5 is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID (or, more generally, region ID) has sufficient precision to distinguish between a very large number of netpages.

Each reference to the page description 5 is repeatedly encoded in the netpage pattern. Each tag (and/or a collection of contiguous tags) identifies the unique page on which it appears, and thereby indirectly identifies the page description 5. Each tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage sensing device, and the tag data is transmitted to the netpage system via the nearest netpage relay device 601. The pen 400 is wireless and communicates with the netpage relay device 601 via a short-range radio link. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description 5 for each printed netpage 1.

2 Netpage Tags 2.1 Tag Data Content

Each tag 4 identifies an absolute location of that tag within a region of a substrate.

Each interaction with a netpage should also provide a region identity together with the tag location. In a preferred embodiment, the region to which a tag refers coincides with an entire page, and the region ID is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

As described in the Applicant's previous applications (e.g. U.S. Pat. No. 6,832,717), the region identity may be encoded discretely in each tag 4. As will be described in more detail below, the region identity may be encoded by a plurality of contiguous tags in such a way that every interaction with the substrate still identifies the region identity, even if a whole tag is not in the field of view of the sensing device.

Each tag 4 should preferably identify an orientation of the tag relative to the substrate on which the tag is printed. Orientation data read from a tag enables the rotation (yaw) of the pen 400 relative to the substrate to be determined.

A tag 4 may also encode one or more flags which relate to the region as a whole or to an individual tag. One or more flag bits may, for example, signal a sensing device to provide feedback indicative of a function associated with the immediate area of the tag, without the sensing device having to refer to a description of the region. A netpage pen may, for example, illuminate an "active area" LED when in the zone of a hyperlink. Alternatively, an active area flag may indicate to the pen 400 to forward captured input immediately to the Netpage server 10.

A tag 4 may also encode a digital signature or a fragment thereof. Tags encoding (partial) digital signatures are useful in applications where it is required to verify a product's authenticity. Such applications are described in, for example, US Publication No. 2007/0108285, the contents of which is herein incorporated by reference. The digital signature may be encoded in such a way that it can be retrieved from every interaction with the substrate. Alternatively, the digital signature may be encoded in such a way that it can be assembled from a random or partial scan of the substrate.

It will, of course, be appreciated that other types of information (e.g. tag size etc) may also be encoded into each tag or a plurality of tags, as will be explained in more detail below.

2.2 General Tag Structure

Figure 3:
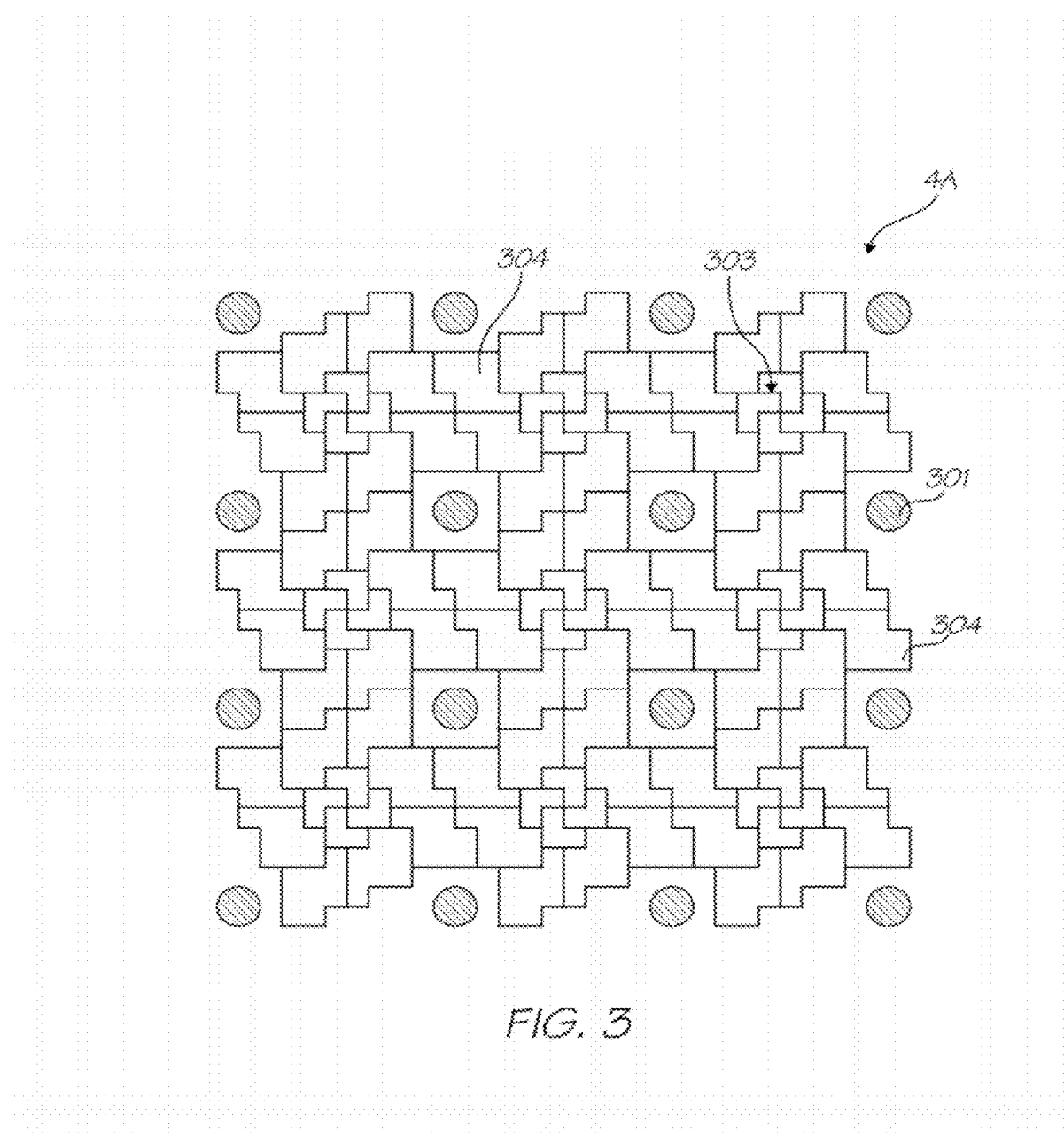
FIG. 3 shows a tag structure with 3×3 symbol groups.
Figure 4:
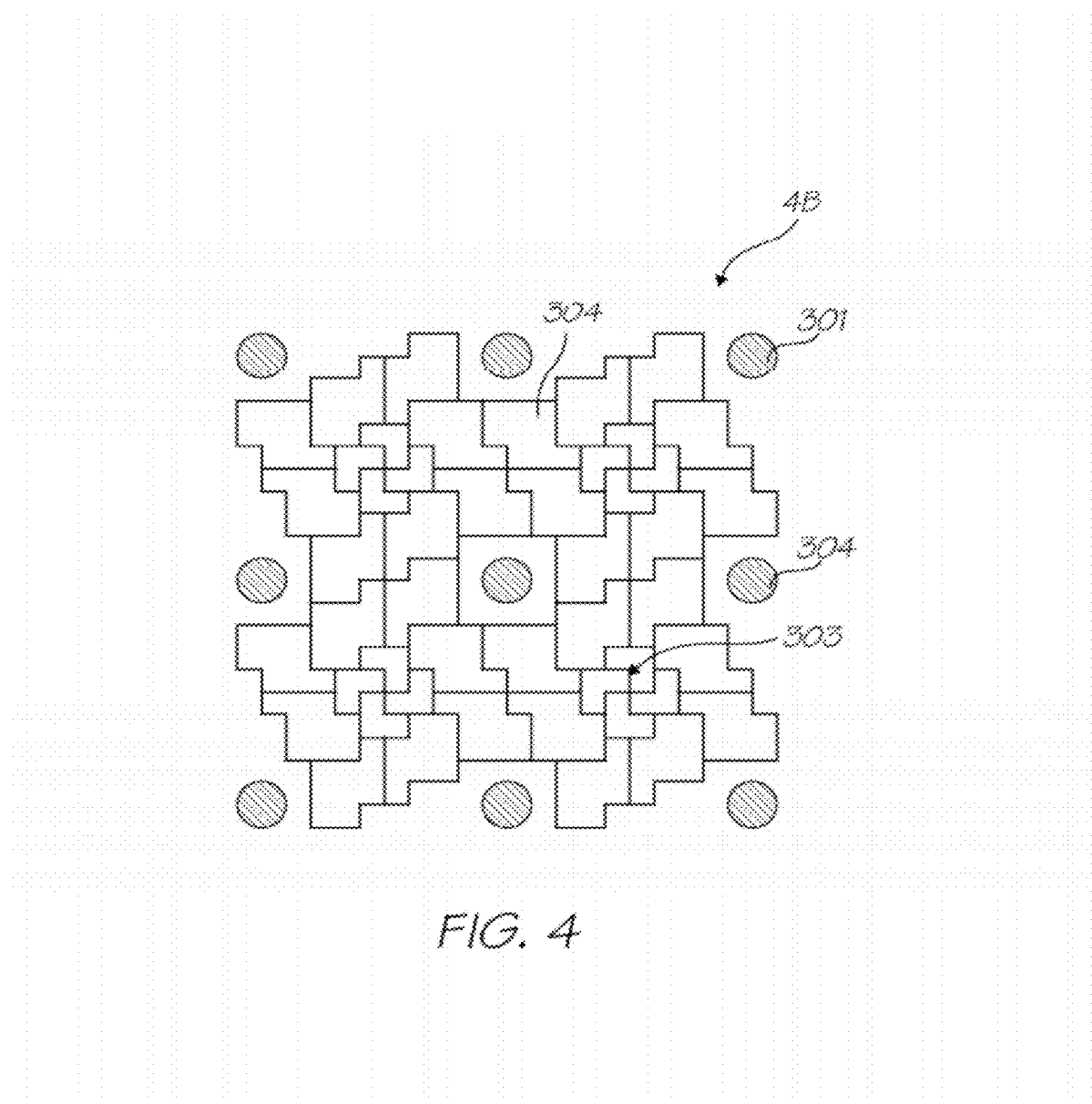
FIG. 4 shows a tag structure with 2×2 symbol groups.
Figure 5:
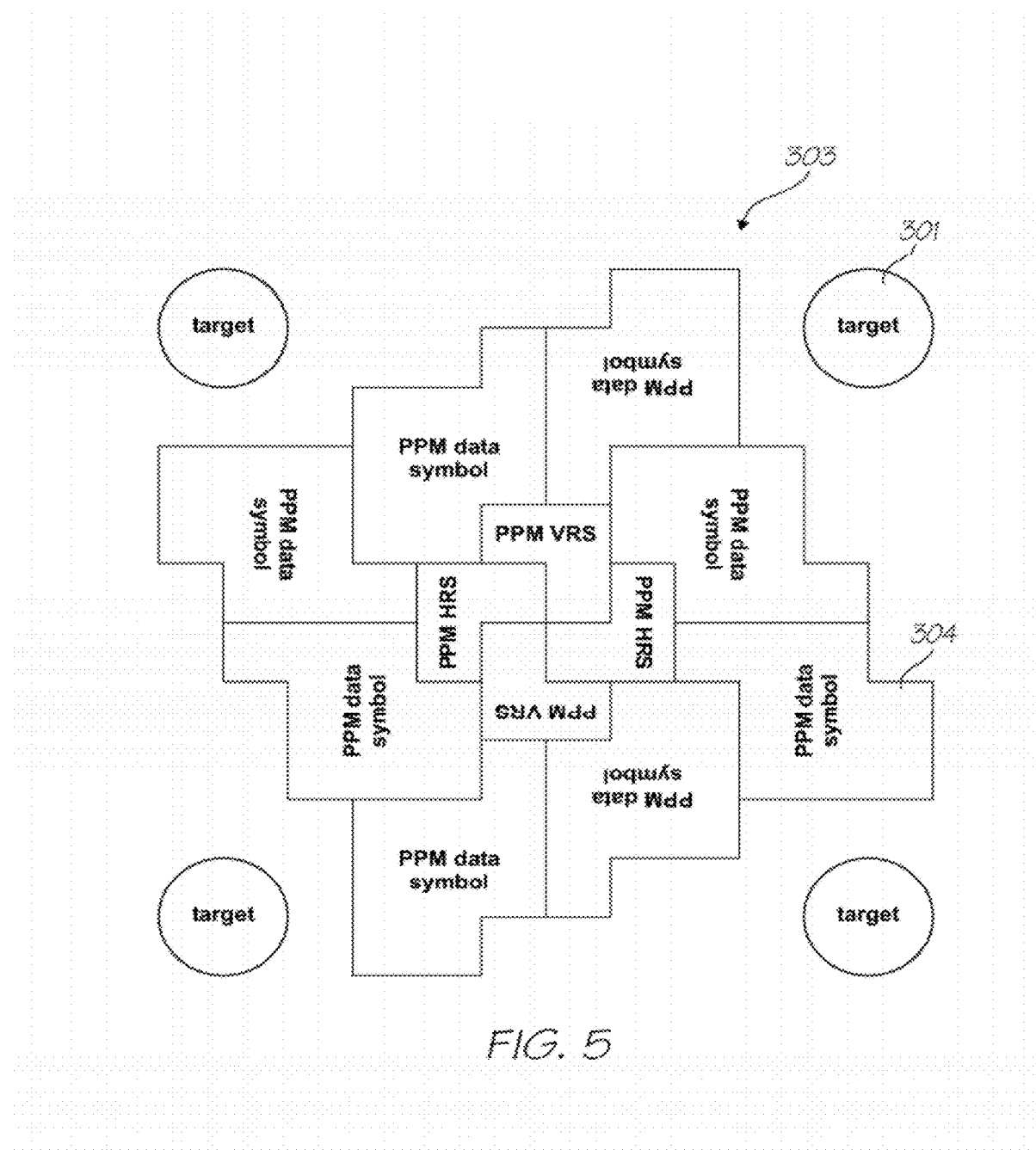
FIG. 5 shows a symbol group.

As described above in connection with FIG. 1, the netpage surface coding generally consists of a dense planar tiling of tags. In the present invention, each tag 4 is represented by a coding pattern which contains two kinds of elements. Referring to FIGS. 3 to 5, the first kind of element is a target element. Target elements in the form of target dots 301 allow a tag 4 to be located in an image of a coded surface, and allow the perspective distortion of the tag to be inferred. The second kind of element is a data element in the form of a macrodot 302 (see FIG. 6). The macrodots 302 encode data values. As described in the Applicant's earlier disclosures (e.g. U.S. Pat. No. 6,832,717), the presence or absence of a macrodot was be used to represent a binary bit. However, the tag structure of the present invention encodes a data value using multi-pulse position modulation, which is described in more detail in Section 2.3.

The coding pattern 3 is represented on the surface in such a way as to allow it to be acquired by an optical imaging system, and in particular by an optical system with a narrowband response in the near-infrared. The pattern 3 is typically printed onto the surface using a narrowband near-infrared ink.

2.2.1 Tag Structure with 3×3 Symbol Groups

FIG. 3 shows the structure of a complete tag 4A with target elements 301 shown. The tag 4A is square and contains sixteen target elements. Those target elements 301 located at the edges and corners of the tag (twelve in total) are shared by adjacent tags and define the perimeter of the tag. The high number of target elements 301 advantageously facilitates accurate determination of a perspective distortion of the tag 4A when it is imaged by the Netpage pen 400. This improves the accuracy of tag sensing and, ultimately, position determination.

The tag 4A consists of a square array of nine symbol groups 303. Symbol groups 303 are demarcated by the target elements 301 so that each symbol group is contained within a square defined by four target elements. Adjacent symbol groups 303 are contiguous and share targets.

Since the target elements 301 are all identical, they do not demarcate one tag from its adjacent tags. Viewed purely at the level of target elements, only symbol groups 303, which define cells of a target grid, can be distinguished—the tags 4A themselves are indistinguishable by viewing only the target elements. Hence, tags 4A must be aligned with the target grid as part of tag decoding.

2.2.2 Tag Structure with 2×2 Symbol Groups

FIG. 4 shows the structure of an alternative tag 4B with target elements 301 shown. The tag 4B is square, but differs from the tag 4A in that it contains nine target elements. Those target elements 301 located at the edges and corners of the tag (eight in total) are shared by adjacent tags and define the perimeter of the tag.

The tag 4B consists of a square array of four symbol groups 303. An individual symbol group 303, used in either tag 4A or 4B, is described in Section 2.3

2.3 Symbol Groups

As shown in FIG. 5, each of the symbol groups 303 comprises eight data symbols 304. In addition, each symbol group 303 comprises a pair of registration symbols—a vertical registration symbol ('VRS') and a horizontal registration symbol ('HRS'). These allow the orientation and translation of the tag in the field of view to be determined. Translation refers to the translation of tag(s) relative to the symbol groups 303 in the field of view. In other words, the registration symbols enable alignment of the 'invisible' tags with the target grid.

Figure 6:
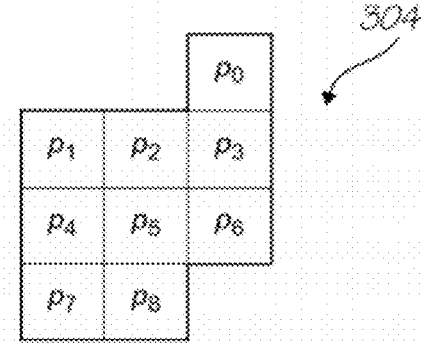
FIG. 6 shows the layout of a 9PPM data symbol.

Each data symbol 304 is a multi-pulse position modulated (PPM) data symbol. Typically, each PPM data symbol 304 encodes either 5-bits or 6-bits using 2-9PPM or 3-9PPM encoding, respectively. i.e. 2 macrodots in any of 9 positions $\{p_0, p_1, p_2, p_3, p_4, p_5, p_6, p_7, p_8\}$ or 3 macrodots in any of the 9 positions $\{p_0, p_1, p_2, p_3, p_4, p_5, p_6, p_7, p_8\}$. FIG. 6 shows the layout for a 2-9PPM or 3-9PPM data symbol 304.

Table 1 defines the mapping from 2-9PPM symbol values to data symbol values. Unused symbol values can be treated as erasures.

TABLE 1

2-9PPM symbol to data symbol value mapping

| 2-9PPM symbol value ($p_8$-$p_0$) | data symbol value (base 16) |
|---|---|
| 000, 000, 011 | 0 |
| 000, 000, 101 | 1 |
| 000, 000, 110 | 2 |
| 000, 001, 001 | 3 |
| 000, 001, 010 | 4 |
| 000, 001, 100 | 5 |
| 000, 010, 001 | 6 |
| 000, 010, 010 | 7 |
| 000, 010, 100 | 8 |
| 000, 011, 000 | 9 |
| 000, 100, 001 | a |
| 000, 100, 010 | b |
| 000, 100, 100 | c |
| 000, 101, 000 | d |
| 000, 110, 000 | e |
| 001, 000, 001 | f |
| 001, 000, 010 | 10 |
| 001, 000, 100 | 11 |
| 001, 001, 000 | 12 |
| 001, 010, 000 | 13 |
| 001, 100, 000 | 14 |
| 010, 000, 001 | 15 |
| 010, 000, 010 | 16 |
| 010, 000, 100 | 17 |
| 010, 001, 000 | 18 |
| 010, 010, 000 | 19 |
| 010, 100, 000 | 1a |
| 011, 000, 000 | 1b |
| 100, 000, 001 | 1c |
| 100, 000, 010 | 1d |
| 100, 000, 100 | 1e |
| 100, 001, 000 | 1f |
| 100, 010, 000 | unused |
| 100, 100, 000 | unused |
| 101, 000, 000 | unused |
| 110, 000, 000 | unused |

The mapping from 3-9PPM symbol values to data symbol values follows a similar scheme to the mapping scheme described in Table 1. A 3-9PPM data symbol maps to 84 data symbol values in total. However, only the first 64 of these 3-9PPM data symbol values are used to map to successive 6-bit data symbol values. Unused symbols are again treated as erasures.

3-9PPM data symbols have the advantage of allowing more data to be encoded in each symbol. However, 2-9PPM data symbols have the advantage of using less ink and, therefore, have less visible coloration of the substrate, particularly if the ink used to print the coding pattern 3 is not perfectly invisible.

As noted above, each symbol group also contains a 2-6PPM vertical registration symbol (VRS) and a 2-6PPM horizontal registration symbol (HRS), which will be described in more detail in Section 2.6.

2.4 Targets and Macrodots

Figure 7:
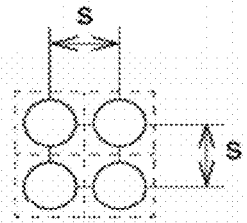
FIG. 7 shows the spacing of macrodot positions.

The spacing of macrodots 302 in both dimensions, as shown in FIG. 7, is specified by the parameter s. It has a nominal value of 127 µm, based on 8 dots printed at a pitch of 1600 dots per inch.

Only macrodots 302 are part of the representation of a symbol 304 in the pattern. The outline of a symbol 304 is shown in, for example, FIGS. 3 to 5 merely to elucidate more clearly the structure of a tag 4.

A macrodot 302 is nominally square with a nominal size of 0.5 s. However, it is allowed to vary in size by ±10% according to the capabilities of the device used to produce the pattern.

A target 301 is nominally circular with a nominal diameter of 1.5 s. However, it is allowed to vary in size by ±10% according to the capabilities of the device used to produce the pattern.

Each symbol group 303 has a width of 10 s. Therefore, each tag 4A (having a 3×3 tag structure) has a width of 30 s and a length of 30 s. Similarly, each tag 4B (having a 2×2 tag structure) has a width of 20 s and a length of 20 s.

However, it should be noted from FIGS. 3 and 4 that the tags 4A and 4B are configured so that some data symbols extend beyond the perimeter edge of the tag by one macrodot unit (1 s), and interlock with complementary symbol groups from adjacent tags. This arrangement provides a tessellated pattern of data symbols 304 within the target grid.

The macrodot spacing, and therefore the overall scale of the tag pattern, is allowed to vary by 170 µm and 120 µm according to the capabilities of the device used to produce the pattern. Any deviation from the nominal scale is recorded in each tag (via the macrodot size ID field) to allow accurate generation of position samples.

These tolerances are independent of one another. They may be refined with reference to particular printer characteristics.

If the macrodot spacing exceeds 127 µm then the tag is limited to four symbol groups as described in Section 2.2.2.

2.5 Field of View

As mentioned above, the tags 4A and 4B are designed to allow all tag data to be recovered from an imaging field of view roughly the size of the tag.

Although data which is common to a set of tags, in one or both spatial dimensions, may be decoded from fragments from adjacent tags, pulse-position modulated values are best decoded from spatially-coherent samples (i.e. from a whole symbol as opposed to partial symbols at opposite sides of the field of view), since this allows raw sample values to be compared without first being normalized. This implies that the field of view must be large enough to contain two complete copies of each such pulse-position modulated value. The tag is designed so that the maximum extent of a pulse-position modulated value is four macrodots. Making the field of view at least as large as the tag plus four macrodot units guarantees that pulse-position modulated values can be coherently sampled.

2.6 Registration Symbols

Figure 8:
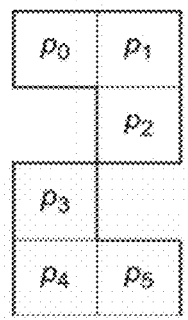
FIG. 8 shows the layout of a registration symbol.

Each registration symbol is encoded using 2-6PPM. FIG. 8 shows the layout of the registration symbol.

As shown in FIG. 5, the horizontal and vertical registration symbols each appear once within a symbol group 303. The registration symbols of an entire tag typically indicate the vertical and horizontal translation of the tag by coding two orthogonal translation codes, and the orientation of the tag by coding two orthogonal direction codes. Each registration symbol may also encode a one-bit symbol of a flag code.

Table 2 defines the mapping from 2-6PPM registration symbol values to flag code, direction code and translation code symbol values.

TABLE 2

2-6PPM registration symbol values to flag code, direction code and translation code symbol mapping

| 2-6PPM symbol value {p₅-p₀} | translation code symbol value | direction code symbol value | flag code symbol value |
|---|---|---|---|
| 001, 001 | 0 | 0 | unspecified |
| 100, 010 |  | 1 |  |
| 001, 010 | 1 | 0 | 0 |
| 000, 101 |  |  | 1 |
| 010, 100 |  | 1 | 0 |
| 101, 000 |  |  | 1 |
| 010, 001 | 2 | 0 | unspecified |
| 100, 100 |  | 1 |  |
| 000, 011 | 3 | 0 |  |
| 000, 110 |  | 1 |  |
| 011, 000 | 4 | 0 |  |
| 110, 000 |  | 1 |  |
| 001, 100 | unused |  |  |
| 010, 010 |  |  |  |
| 100, 001 |  |  |  |

2.6.1 Registration Symbols for Tag 4A (3×3 Tag Structure)

Tags 4A (having a 3×3 tag structure) use the first eight registration symbol values in Table 2 i.e. those registration symbol values mapping to a translation code symbol value of 0, 1 or 2. In other words, if the registration symbol value maps to a translation code symbol value of 0, 1 or 2, then the position-coding pattern is identified as containing tags 4A having nine symbol groups 303 contained in one tag 4A.

The additional translation code symbol values (i.e. 3 and 4) shown in Table 2 are reserved for tags 4B (having a 2×2 tag structure). Thus, if the registration symbol value maps to a translation code symbol value of 3 or 4, then the position-coding pattern is identified as containing tags 4B having four symbol groups 303 contained in one tag 4B. In this way, the registration symbol provides a means of distinguishing position-coding patterns containing tags 4A or tags 4B, as described herein. Subsequent decoding of PPM data symbols proceeds in accordance with the position-coding pattern identified from decoding the registration symbol(s).

In the tag 4A, each row of symbol groups and each column of symbol groups encodes a three-symbol 3-ary cyclic position code. (The Applicant's cyclic position codes are described in U.S. Pat. No. 7,082,562, the contents of which is herein incorporated by reference). The code consists of the codeword (0, 1, 2) and its cyclic shifts. The code has a minimum distance of 3, allowing a single symbol error to be corrected. For each of the two orthogonal translations, the three translation codes of an entire tag form a code with a minimum distance of 9, allowing 4 symbol errors to be corrected. If additional symbols are visible within the field of view then they can be used for additional redundancy.

The translation code symbol in the middle of the codeword (i.e. 1) is mapped to a set of 2-6PPM symbol values that are each other's reverse, while the two translation code symbols at the ends of the codeword (i.e. 0 and 2) are each mapped to a set of 2-6PPM symbol values that are the reverses of the 2-6PPM symbol values in the other set. Thus a 0 read upside-down (i.e. rotated 180 degrees) becomes a 2, and vice versa, while a 1 read upside-down remains a 1. This allows translation to be determined independently of rotation.

Furthermore, in the tag 4A, each 2-6PPM symbol value and its reverse map to opposite direction code symbol values (Table 2). The vertical registration symbols of an entire tag encode 9 symbols of a vertical direction code. This has a minimum distance of 9, allowing 4 symbol errors to be corrected. The horizontal registration symbols of an entire tag encode 9 symbols of a horizontal direction code. This has a minimum distance of 9, allowing 4 symbol errors to be corrected. If additional symbols are visible within the field of view then they can be used for additional redundancy. Any erasures detected during decoding of a translation code can also be used during decoding of a direction code, and vice versa. Together the orthogonal direction codes allow the orientation of the tag to be determined.

The top left corner of an un-rotated tag is identified by a symbol group whose translation symbols are both zero and whose direction symbols are both zero.

The active flag symbol consists of one bit of data, and is encoded in each vertical and horizontal registration symbol, as shown in Table 2. The active flag symbol allows the Netpage pen 400 to provide immediate feedback to a user without reference to the corresponding page description 5. For example, the pen 400, upon detection of an active flag, may indicate to a user (e.g. via an LED) that it is positioned within the zone of a hyperlink.

An active flag symbol is unique to a tag and is therefore coded redundantly in each quadrant of the tag. Since the active flag symbol is encoded in each registration symbol, it appears eight times within each quadrant. Eight symbols form a code with a minimum distance of 8, allowing 3 errors to be corrected. If additional symbols are visible within the field of view then they can be used for additional redundancy. Any erasures detected during decoding of translation and/or direction codes can also be used during decoding of the flag code, and vice versa.

2.6.2 Registration Symbols for Tags 4B (2×2 Tag Structure)

Each registration symbol contained in the tags 4B is positioned and configured in the same way as the registration symbols contained in tags 4A. However, as mentioned in Section 2.6.1, the tags 4B utilize only those registration symbol values mapping to the translation code symbol values (3, 4). This enables the registration symbol to identify the tags 4B containing four symbols groups, and distinguish them from the tags 4A containing nine symbol groups.

In the tags 4B, each row of symbol groups and each column of symbol groups encodes a two-symbol 2-ary cyclic position code. (The Applicant's cyclic position codes are described in U.S. Pat. No. 7,082,562, the contents of which is herein incorporated by reference). The code consists of the codeword (3, 4) and its cyclic shifts. For each of the two orthogonal translations, the two translation codes of an entire tag form a code with a minimum distance of 4, allowing 1 symbol error to be corrected. If additional symbols are visible within the field of view then they can be used for additional redundancy.

The two translation code symbols (3 and 4) are each mapped to a set of 2-6PPM symbol values that are the reverses of the 2-6PPM symbol values in the other set. Thus a 3 read upside-down (i.e. rotated 180 degrees) becomes a 4, and vice versa. This allows translation to be determined independently of rotation.

Furthermore, in the tags 4B, each 2-6PPM symbol value and its reverse map to opposite direction code symbol values (Table 2). The vertical registration symbols of an entire tag encode 4 symbols of a vertical direction code. This has a minimum distance of 4, allowing 1 symbol error to be corrected. The horizontal registration symbols of an entire tag encode 4 symbols of a horizontal direction code. This has a minimum distance of 4, allowing 1 symbol error to be corrected. If additional symbols are visible within the field of view then they can be used for additional redundancy. Any erasures detected during decoding of a translation code can also be used during decoding of a direction code, and vice versa. Together the orthogonal direction codes allow the orientation of the tag to be determined.

The top left corner of an un-rotated tag is identified by a symbol group whose translation symbols are both zero and whose direction symbols are both zero.

Although as shown in Table 2, the 2-6PPM registration symbol does not allow flag codes for the tags 4B, it will be appreciated that a 3-6PPM registration symbol mapping to 20 available symbol values would allow the tags 4B to contain flag codes, if desired. In this case, 12 registration symbol values (3×2×2) would be used for the tags 4A, and 8 registration symbols value (2×2×2) would be used for the tags 4B.

2.7 Merged Codeword Encoding

In the Applicant's copending applications, U.S. application Ser. No. 12/178,611 and Ser. No. 12/539,579, which will be substituted with the corresponding application number, once assigned. The contents of which are incorporated herein by reference; tags generally encode codewords using a distinct set of PPM data symbols for each codeword.

As described in NPT087US, an x-coordinate Reed-Solomon codeword may be encoded by a distinct set of X data symbols (e.g. X0, X1, X2, X3, X4, X5, X6, X7, X8, X9, X10) and a y-coordinate Reed-Solomon codeword may be encoded by a distinct set of Y data symbols (e.g. Y0, Y1, Y2, Y3, Y4, Y5, Y6, Y7, Y8, Y9, Y10). Moreover, the Applicant has described various arrangements of X and Y data symbols within each tag, which make use of the fact that the x-coordinate does not vary within a column of tags, and the y-coordinate does not vary within a row of tags. This enables space to be saved in the tag, whilst still allowing each complete coordinate codeword to be read from a substantially tag-sized field of view. For example, at least some of the X data symbols may be placed in a column of the tag to avoid replicating the X data symbols in each east-west half of the tag. Likewise, at least some of the Y data symbols may be placed in a row of the tag to avoid replicating the Y data symbols in each north-south half of the tag.

Likewise, information common to a set of contiguous tags in a surface region may be encoded by one or more common Reed-Solomon codewords e.g. A, B, C and D codewords. As described in, for example, NPT087US, each such Reed-Solomon codeword is encoded by a distinct set of PPM data symbols. Common codewords typically encode a region ID, but may also encode other information, such as an encoding format, a region flag, a pattern scale identifier (e.g. tag size ID or macrodot size ID) and a CRC.

A secret-key signature or a fragment of an embedded data object may be encoded by an optional Reed-Solomon codeword e.g. E codeword. As described in, for example, NPT087US, this optional Reed-Solomon codeword is encoded by a distinct set of PPM data symbols. The provision of a distinct set of PPM data symbols for each codeword necessarily uses up valuable space in each tag. As an alternative to encoding each codeword in a distinct set of PPM symbols, individual symbols from two (or more) codewords can be merged into a single PPM symbol.

Merged PPM data symbols not only save space in each tag, but may also assist in detecting errors during decoding. For example, if a symbol from one codeword is found to be in error during ECC decoding, then any symbol (or symbols) located in the same PPM symbol can be flagged as an erasure.

The symbols from two (or more) codewords in a merged PPM data symbol may use the same error-correcting code (ECC) or they may use different error-correcting codes. For example, each symbol of the x-coordinate and y-coordinate codewords can be combined with a symbol of the common codeword(s) in a single PPM symbol. In this case the coordinate codewords may be encoded using a code with a smaller symbol size than the common codeword(s), such as a binary code.

Whilst it is not feasible to elucidate all possible code configurations utilizing merged PPM data symbols, Tables 3 and 4 give examples of some possible code configurations using merged 2-9PPM and 3-9PPM data symbols. Where the error-correcting code (ECC) symbol size has multiple bits, then a Reed-Solomon code is typically used. Where the ECC symbol size is 1 bit, then a cyclic code, as described in Section 2.8, is typically used.

TABLE 3

Examples of combined tag encoding strategies

| tag encoding strategy | tag configuration (symbols) | PPM encoding | merged symbol size | coordinate codeword symbol size | common codeword symbol size | available data capacity per tag |
|---|---|---|---|---|---|---|
| (1) | $2^2 \times 8 = 32$ | 2-9PPM | 5b | 1b | 4b | 160b |
| (2) | $2^2 \times 8 = 32$ | 3-9PPM | 6b | 1b | 5b | 192b |
| (3) | $3^2 \times 8 = 72$ | 2-9PPM | 5b | 1b | 4b | 360b |
| (4) | $3^2 \times 8 = 72$ | 3-9PPM | 6b | 1b | 5b | 432b |

TABLE 4

Examples of Coordinate and Common Codeword Configurations

| | Coordinate Codeword Configuration(s) for each tag encoding strategy | | | Common Codeword Configuration(s) for each tag encoding strategy | | |
|---|---|---|---|---|---|---|
| tag encoding strategy | Coordinate codewords per tag | Cyclic Code | total data capacity of coordinate codewords | Common codewords per tag | Reed-Solomon Code | total data capacity of coordinate codeword(s) |
| (1) | 2 (X, Y) | (16, 8) | $2 \times 8 \times 1b = 16b$ | 2 (A, B) | (15, 7) | $2 \times 7 \times 4b = 56b$ |
| (2) | 2 (X, Y) | (16, 8) | $2 \times 8 \times 1b = 16b$ | 2 (A, B) | (16, 8) | $2 \times 8 \times 5b = 80b$ |
| | 2 (X, Y) | (16, 8) | $2 \times 8 \times 1b = 16b$ | 1 (A) | (31, 23) | $1 \times 23 \times 5b = 115b$ |
| | 2 (X, Y) | (32, 16) | $2 \times 16 \times 1b = 32b$ | 2 (A, B) | (15, 7) | $2 \times 7 \times 4b = 56b$ |
| (3) | 2 (X, Y) | (36, 20) | $2 \times 20 \times 1b = 40b$ | 4 (A, B, C, D) + 1 (E) | (15, 7) (12, 4) | $(4 \times 7 \times 4b) + (1 \times 4 \times 4b) = 128b$ |
| (4) | 2 (X, Y) | (36, 20) | $2 \times 20 \times 1b = 40b$ | 4 (A, B, C, D) | (18, 10) | $4 \times 10 \times 5b = 200b$ |
| | 2 (X, Y) | (36, 20) | $2 \times 20 \times 1b = 40b$ | 3 (A, B, C) | (24, 16) | $3 \times 16 \times 5b = 240b$ |
| | 2 (X, Y) | (36, 20) | $2 \times 20 \times 1b = 40b$ | 2 (A, B) | (31, 23) | $2 \times 23 \times 5b = 230b$ |

2.8 Cyclic Codes for Coordinate Encoding

2.8.1 Background

A maximum-length LFSR (linear feedback shift register) produces as output a so-called m-sequence with a length of $2^k-1$, in which every possible non-zero register value appears once before the sequence repeats. Because each k-bit value appears exactly once in the m-sequence, a k-bit window into a known m-sequence yields a unique k-bit subsequence which in turn can be interpreted as a unique position within the m-sequence. Because of the cyclic nature of an m-sequence, a k-bit window onto a recurring m-sequence yields a locally unique position, i.e. modulo the length n of the m-sequence.

Position decoding via a k-symbol window onto a recurring m-sequence of length $2^k-1$ does not allow error detection or correction. However, position decoding via an n-symbol window onto a recurring cyclic codeword of length n does allow error detection and correction.

An arbitrary number of copies of a codeword of a cyclic (n, k) code C can be concatenated to form a sequence of arbitrary length. A window of size n onto the sequence is then guaranteed to yield a codeword of C. If the code is designed to contain exactly n codewords, then the dimension of the code is, by definition, $k = \log_q n$. If the code is designed so that all n codewords belong to the same and only cycle, then the window will yield n different codewords at n successive positions. Since there is a direct correspondence between a codeword and a position in the sequence (modulo n), each codeword can be uniquely mapped to one of n (relative) positions. Significantly, a position can be determined even in the presence of up to $[(d_{min}-1)/2]$ symbol errors.

As discussed in U.S. Pat. No. 7,082,562, the contents of which is herein incorporated by reference, the present Applicant refers to such a code as a "cyclic position code". Any codeword of a cyclic position code defines the code. A cyclic position code is not a linear code, since it does not contain the zero vector. However, it is useful to use the terminology of linear codes in the following discussion. Many good cyclic position codes are linear codes with the zero vector removed.

The cyclic shifts of a binary m-sequence of length $2^k-1$ constitute all of the non-zero codewords of a linear cyclic code of length $n=2^k-1$, dimension k, and minimum distance $d_{min}=2^k-1$ (MacWilliams, F. J. and N. J. A. Sloane, "Pseudo-Random Sequences and Arrays", *Proceedings of the IEEE*, Vol. 64, No. 12, December 1976).

More generally, m-sequences define a subset of the set of simplex codes. The simplex codes have length $n=4m-1$ and minimum distance $d_{min}=(n+1)/2=2$ m. As implied by the name, the codewords of a simplex code define the equidistant vertices of an n-simplex. The minimum and maximum distances of a simplex code are therefore the same. For n prime, the Paley construction can be used to construct a cyclic simplex code using quadratic residues [MacWilliams, F. J. and N. J. A. Sloane, *The Theory of Error-Correcting Codes*, North-Holland, 1977; Wicker, S. B., *Error Control Systems for Digital Communication and Storage*, Prentice Hall, 1995]. For n prime or $d_{min}=2^k-1$, then, a simplex code is cyclic and therefore defines a cyclic position code.

A cyclic simplex code of length $n=4m-1$ defines an optimal cyclic position code in the sense that it has the largest minimum distance possible not only for its length but for any length $$n < 4(m+1)-1.$$

A w-bit window onto a cyclic simplex code also defines a cyclic position code. In this case the average distance within the window is:

$$\text{avg}(d(w)) = w \, d_{min}/n$$

The minimum distance within the window converges with the average distance within the window (and ultimately the minimum distance of the code) as the window size approaches the code length:

$$d_{min}(w) \rightarrow \text{avg}(d(w)) \rightarrow d_{min} \text{ as } w \rightarrow n$$

For the same window size w, a larger code size n implies a smaller minimum distance $d_{min}(w)$ within the window.

2.8.2 Types of Coordinate Encoding

When a Reed-Solomon coordinate codeword is spatially distributed throughout a tag (without replication), it becomes impractical to recover the entire codeword from an imaging window arbitrarily aligned with the tag pattern. The imaging window would be required to have a diameter of at least two tag diagonals in order to guarantee acquisition of a complete non-replicated coordinate codeword. Alternatively, the Applicant has described symbol arrangements whereby at least some X data symbols are positioned in a column of the tag, and at least some Y data symbols are positioned in a row of the tag (NPT087US). Symbol arrangements of this type can obviate at least some replication of coordinate data symbols whilst still allowing a substantially tag-sized imaging window. However, special symbol arrangements of this type inevitably constrain the design of tags.

However, if the coordinate codeword is encoded using an underlying cyclic code then it becomes possible to reconstruct a valid codeword from fragments of adjacent tags' codewords. A coordinate codeword size of w bits corresponds to a w-bit window onto an underlying cyclic code of length n.

There are two ways to encode the coordinates of adjacent tags. Assuming a codeword size of w bits, adjacent tags can either encode successive w-bit segments of the underlying code, or adjacent tags can encode w-bit segments of the underlying code shifted one bit relative to each other.

2.8.3 Adjacent Tags Encoding One-Bit Shifted Subsequences

This approach has the advantage that the dimension of the code, which determines its spatial extent, is minimized. Furthermore, as noted above, the minimum distance of a windowed cyclic position code increases with decreasing code dimension, so it is advantageous to minimize the code dimension. This approach nominally has the disadvantage that it sometimes only allows w−1 bits of the cyclic position code to be recovered from the window. However, as illustrated in Table 5, this does not necessarily imply a reduction in the minimum distance within the window.

The alternative approach, whereby adjacent tags encode successive w-bit segments of the underlying code, has the advantage that it always allows w bits of the cyclic position code to be recovered from the window. However, this is usually outweighed by the reduction in minimum distance that the larger required code dimension entails.

Assuming binary cyclic position codes for the x and y coordinates consists of the following bit sequences respectively:

$$(x_{n-1}, x_{n-2}, \ldots, x_1, x_0)$$

$$(y_{n-1}, y_{n-2}, \ldots, y_1, y_0)$$

In the one-bit shifted approach, the ith tag in the x direction (counting from the left) and jth tag in the y direction (counting from the top) encodes the following w-bit subsequences:

$$(x_{i+w-1}, x_{i+w-2}, \ldots, x_{i+1}, x_i)$$

$$(y_{j+w-1}, y_{j+w-2}, \ldots, y_{j+1}, y_j)$$

32-Bit Coordinate Codeword Example

Figure 9:
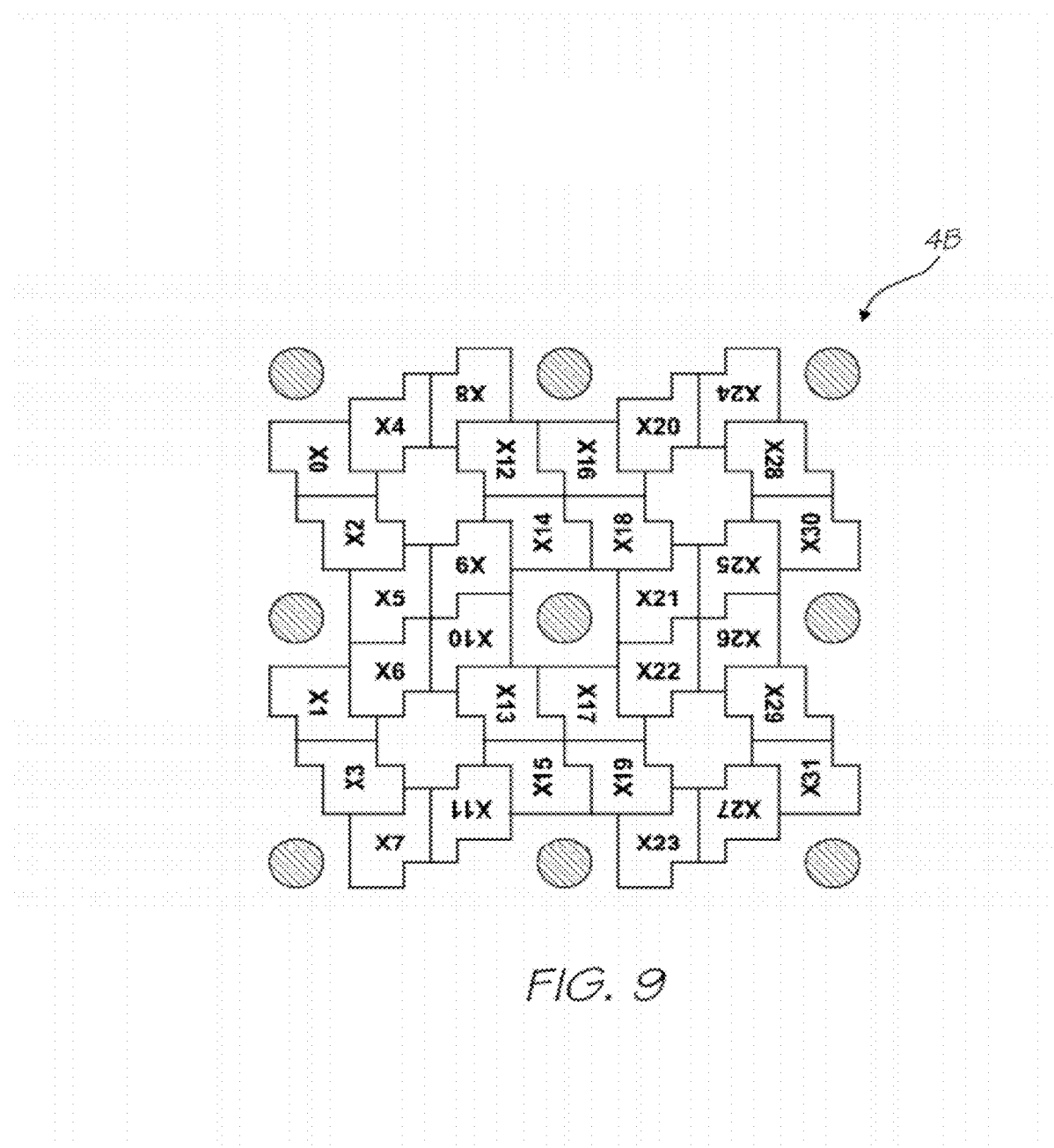
FIG. 9 shows the layout of a 32-bit x-coordinated codeword.

FIG. 9 shows the layout of a 32-bit x-coordinate codeword (i.e. with w=32) in tag 4B, where, for the ith tag in the x direction, symbol X0 encodes bit $x_i$ and symbol X31 encodes bit $x_{i+31}$.

Figure 10:
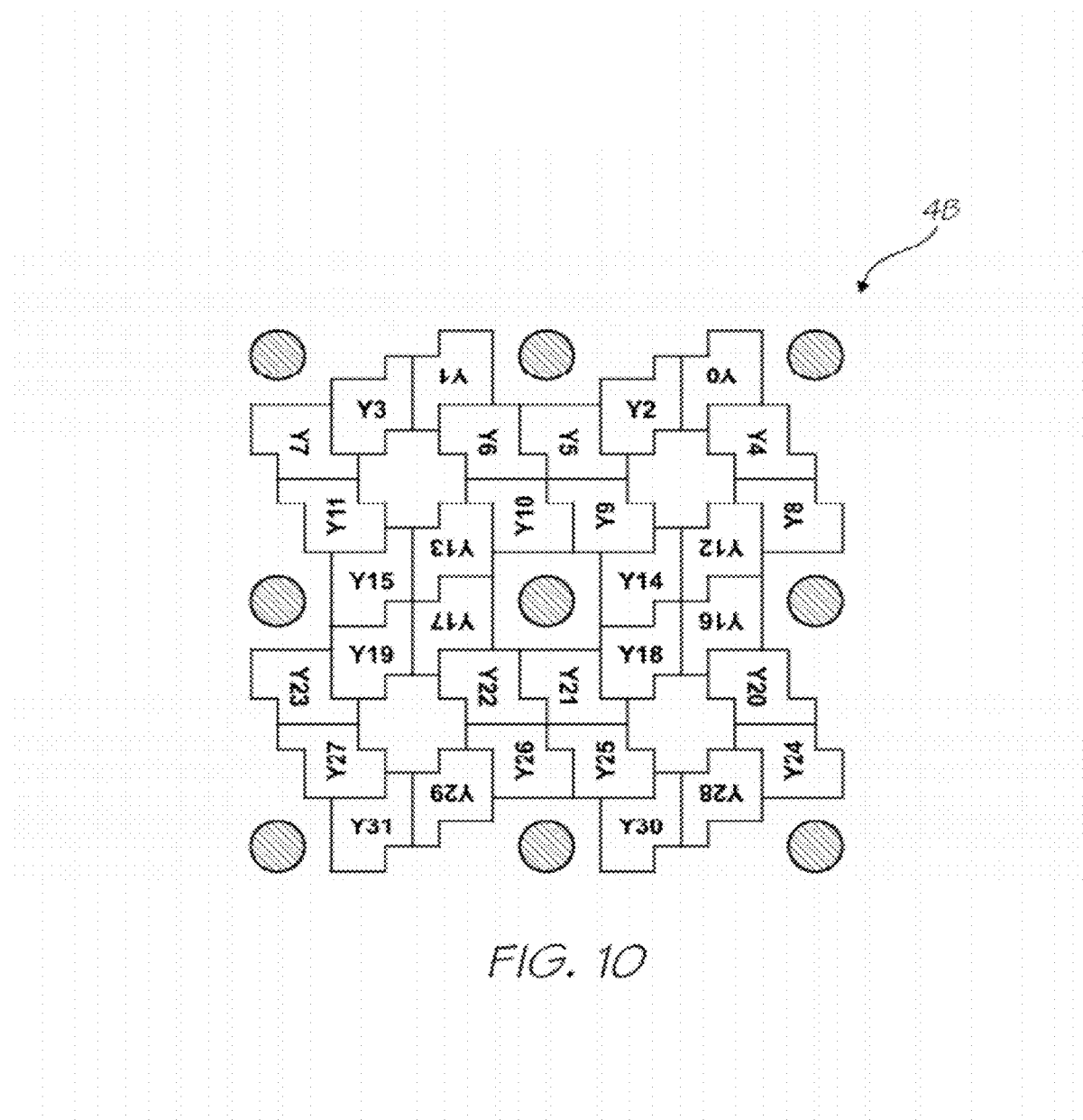
FIG. 10 shows the layout of a 32-bit y-coordinated codeword.

FIG. 10 shows the layout of a 32-bit y-coordinate codeword (i.e. with w=32) in tag 4B, where, for the jth tag in the y direction, symbol Y0 encodes bit $y_j$ and symbol Y31 encodes bit $y_{j+31}$.

The codeword layout in FIGS. 7 and 8 guarantees that a square 24-macrodot window onto the coding pattern will always acquire contiguous 31-bit or 32-bit subsequences from the two cyclic position codes used to encode the x and y coordinates.

A 24-macrodot window corresponds to 20 macrodot units (the length l of the tag) plus four macrodot units (the length q of a symbol). Hence, the 24-macrodot window guarantees that pulse-position modulated values are decoded from spatially-coherent samples (i.e. from a whole symbol as opposed to partial symbols at opposite sides of the field of view).

The symbols in FIG. 9 are arranged in columns, which may overlap partially with each other. A $1^{st}$ column contains symbols X0 and X1; a $2^{nd}$ column contains symbols X2 and X3; a $3^{rd}$ column contains X4, X5, X6 and X7; a $4^{th}$ column contains symbols X8, X9, X10 and X11; a $5^{th}$ column contains symbols X12 and X13 etc. The width v of each column corresponds to the length or width of each symbol, depending on the orientation of symbols within the column. Hence, the maximum width v of each column is 4 macrodots, corresponding to the length of one symbol.

Likewise, the symbols in FIG. 10 are arranged in rows, which may overlap partially with each other. A $1^{st}$ row contains symbols Y0 and Y1; a $2^{nd}$ row contains symbols Y2 and Y3; a $3^{rd}$ row contains Y4, Y5, Y6 and Y7; a $4^{th}$ row contains symbols Y8, Y9, Y10 and Y11; a $5^{th}$ row contains symbols Y12 and Y13 etc. The width v of each column corresponds to the length or width of each symbol, depending on the orientation of symbols within the column. Hence, the maximum width v of each row is 4 macrodots, corresponding to the length of one symbol.

Unless the imaging window coincides precisely with the beginning of a tag or the beginning of certain rows and columns, then a 31-bit subsequence will be acquired from the imaging window rather than the full 32-bit subsequence. For example, a 24-macrodot imaging window beginning 1 macrodot from the left-hand edge of the tag in FIG. 9 (i.e. a window beginning in the middle of the $1^{st}$ column containing X0 and X1) will acquire symbols X4 to X31 from that tag (a first imaged tag), and symbols X0 to X3 from an adjacent tag to the right (a second imaged tag). Since the second imaged tag contains a 32-bit subsequence shifted by one bit relative to the first imaged tag, then symbol X1 in the second imaged tag corresponds to X0 in the first imaged tag; symbol X2 in the second imaged tag corresponds to X1 in the first imaged tag; and symbol X3 in the second imaged tag corresponds to X2 in the first imaged tag. Hence, a contiguous 31-bit subsequence may be assembled, which consists of X0-X2 and X4-X31 in the first imaged tag. Although one bit (X3) is missing from this acquired subsequence, there is still sufficient data to determine a maximally likelihood offset in the cyclic code and, hence, the x-coordinate codeword of the first imaged tag.

Of course, similar considerations apply to the y-coordinate codeword encoded by symbols Y0-Y31 in FIG. 10. Accordingly, any 24-macrodot square window is sufficient to acquire at least a 31-bit subsequence of each off the two underlying code used to encode the x- and y-coordinated. Hence, an x-coordinate codeword and y-coordinate codeword may be determined from each 24-macrodot imaging window.

Figure 11:
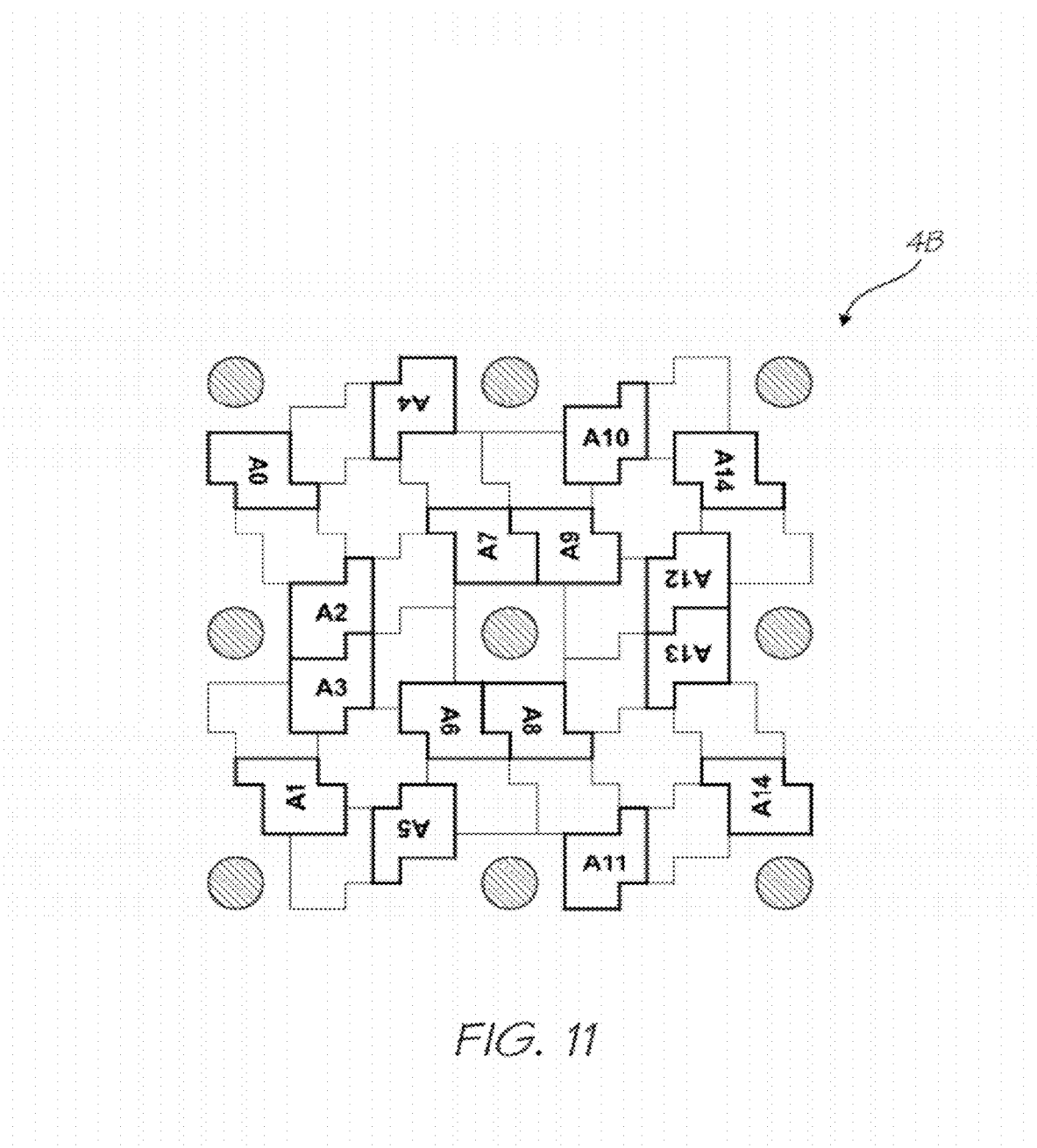
FIG. 11 shows the layout of a common codeword A.
Figure 12:
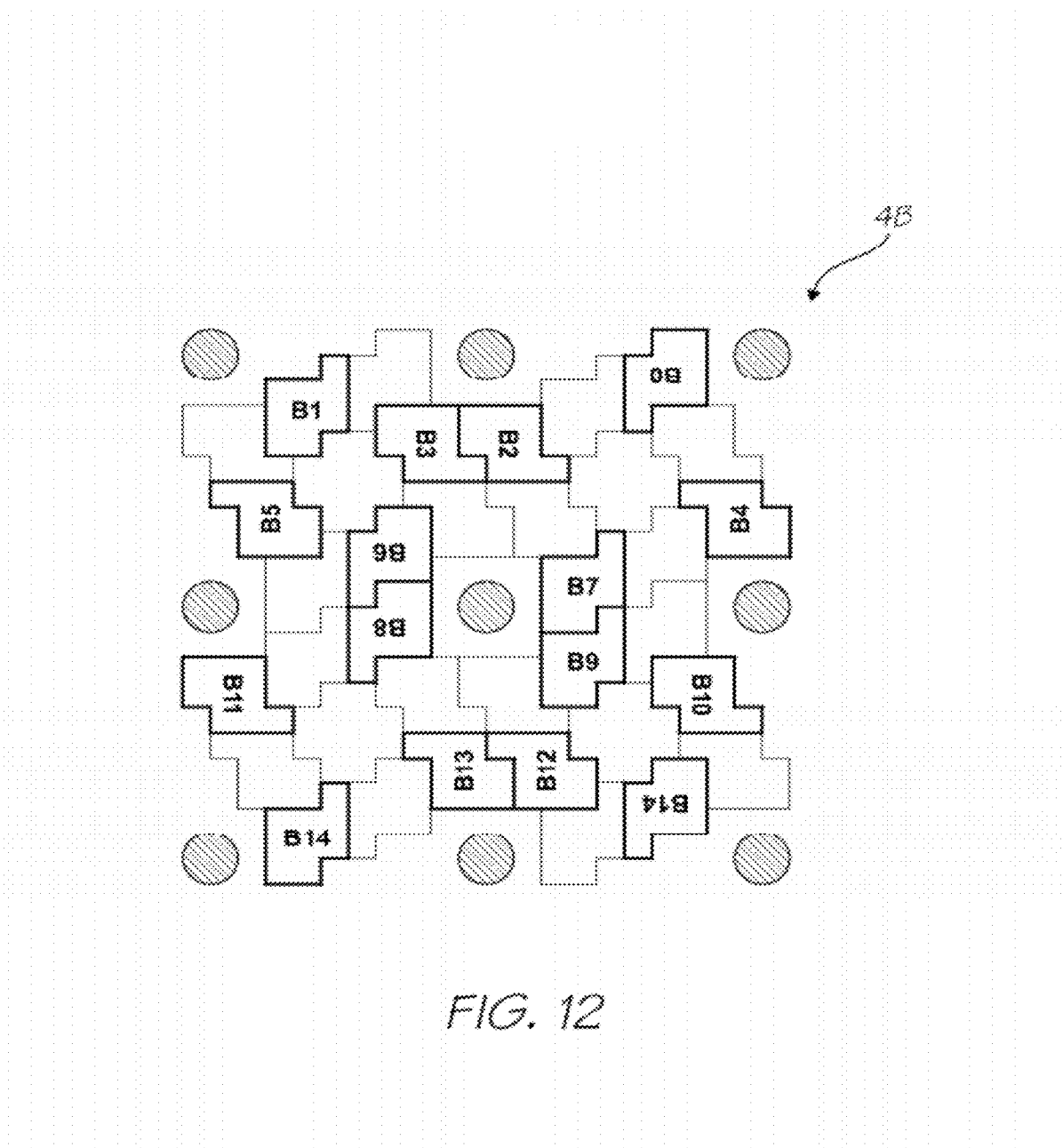
FIG. 12 shows the layout of a common codeword B.

FIG. 11 and FIG. 12 show possible layouts of corresponding common A and B Reed-Solomon codewords defined over $GF(2^4)$ (assuming a 3-9PPM encoding). Combining FIGS. 7 to 10, it will be appreciated that each PPM data symbol in the tag is a merged symbol, as described in Section 2.7, encoding a 1-bit X data symbol from the x-coordinate codeword, a 1-bit Y data symbol from the y-coordinate codeword and either a multi-bit A symbol from a common A Reed-Solomon codeword or a multi-bit B symbol from a common B Reed-Solomon codeword.

As noted earlier, any Reed-Solomon symbols corrected in the A and B codewords can be used to flag erasures in corresponding X and Y symbols during decoding.

16-Bit Coordinate Codeword Example

Figure 13:
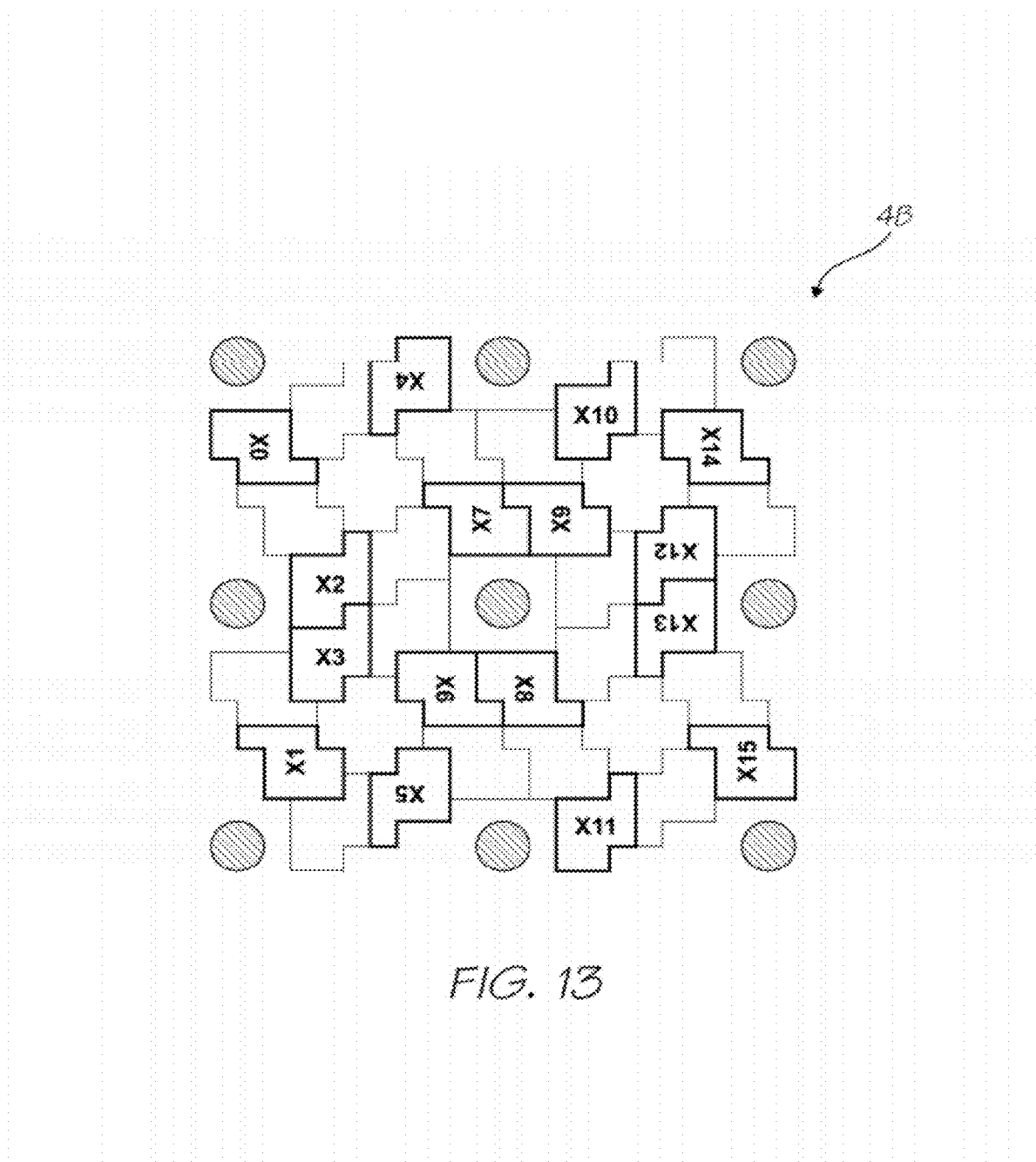
FIG. 13 shows the layout of a 16-bit x-coordinated codeword.

FIG. 13 shows the layout of a 16-bit x-coordinate codeword (i.e. with w=16) in tag 4B, where, for the ith tag in the x direction, symbol X0 encodes bit and symbol encodes bit $x_i$ and symbol X15 encodes bit $x_{i+15}$.

Figure 14:
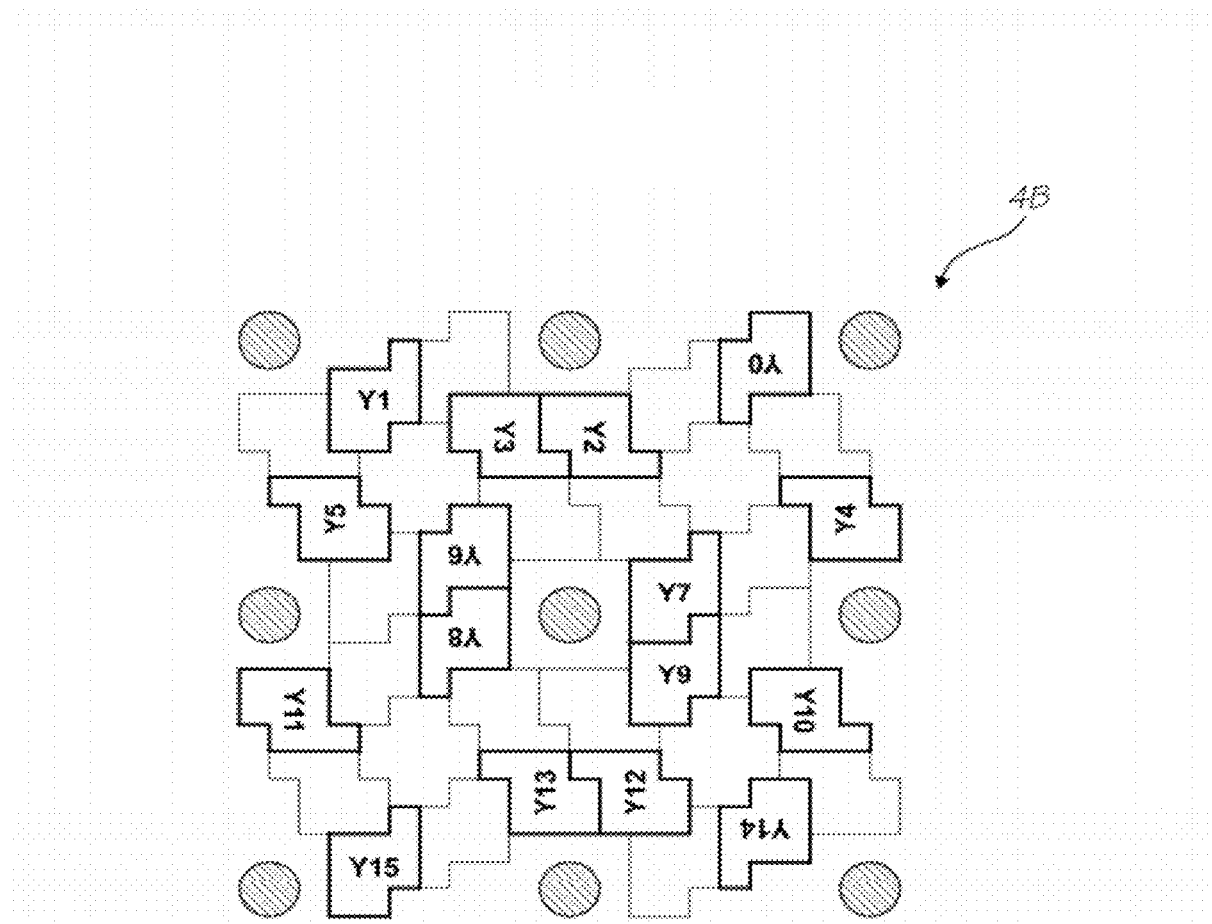
FIG. 14 shows the layout of a 16-bit y-coordinated codeword.

FIG. 14 shows the layout of a 16-bit y-coordinate codeword (i.e. with w=16) in tag 4B, where, for the jth tag in the y direction, symbol Y0 encodes bit $y_j$ and symbol Y15 encodes bit $y_{j+15}$.

Again, the codeword layout in FIGS. 11 and 12 guarantees that a 24-macrodot window onto the tag pattern will always acquire contiguous 15-bit or 16-bit subsequences from the two cyclic position codes used to encode the x and y coordinates.

FIG. 11 and FIG. 12 show possible layouts of corresponding common A and B codewords defined over $GF(2^4)$ (assuming a 2-9PPM encoding), or over $GF(2^5)$ (assuming a 3-9PPM encoding). Combining FIGS. 13 and 14 with FIGS. 11 and 12, it will be appreciated that each PPM data symbol in the tag is a merged symbol, as described in Section 2.7. Some merged PPM data symbols encode a 1-bit X data symbol from the x-coordinate codeword and multi-bit A symbol from a common A Reed-Solomon codeword. Some merged PPM data symbols encode a 1-bit Y data symbol from the y-coordinate codeword a multi-bit B symbol from a common B Reed-Solomon codeword.

2.8.4 Adjacent Tags Encoding Successive Subsequences

In this approach, any given tag contains a w-bit subsequence corresponding to offset i in the cyclic code sequence. Adjacent tags on either side of the given tag contain w-bit subsequences corresponding to offsets (i+w) and (i−w) in the cyclic code sequence. Hence, adjacent tags contain successive w-bit subsequences of the underlying code sequence, rather than 1-bit shift subsequences as described in Section 2.8.3.

As noted above, this approach has the advantage that it always allows w bits of the cyclic position code to be recovered from the window—there is no potential loss of 1 bit from any w-bit subsequence acquired from the 24-macrobit imaging window described in Section 2.8.3. Moreover, determination of fractional tag coordinates is possible, since an offset in the underlying code may correspond to a column or row within a tag, rather than just a particular tag. However, the determination of fractional tag coordinates may only have limited usefulness, because similar information could potentially be derived from the translation codewords.

The layout of coordinate codeword symbols and common codeword symbols in tag 4B may be the same as those used in FIGS. 9 to 14, as described in Section 2.8.3.

Hence, it will be appreciated that each PPM data symbol in tags using the successive subsequence approach may be a merged symbol, as described in Section 2.7. A merged symbol may encode at least one of: a 1-bit X data symbol from an x-coordinate codeword, a 1-bit Y data symbol from a y-coordinate codeword and a multi-bit symbol from a common Reed-Solomon codeword.

Likewise, any Reed-Solomon symbols corrected in the common codeword(s) can be used to flag erasures in corresponding X and Y symbols during decoding.

2.8.5 Optimal Simplex Codes

Table 5 defines some optimal simplex codes for cyclic position coding. These are optimal in the sense that the minimum distance for both window sizes is maximized.

TABLE 5

Some optimal simplex codes for cyclic position coding

| code dimension (k) | code size (n) | spatial extent[a] | primitive polynomial | $d_{min}$ (w = 15, 16) | $d_{min}$ (w = 31, 32) |
|---|---|---|---|---|---|
| 8 | 255 | 0.6 m | 1,0001,1101 | 4 | (9) |
|  |  |  | 1,1000,0111 | (3) | 11 |
| 9 | 511 | 1.2 m | 10,0001,1011 | 3 | 10 |
| 10 | 1023 | 2.4 m | 111,1111,1001 |  |  |

[a]assuming a minimum macrodot spacing of 120 μm

The primitive polynomial refers to the polynomial used to generate the code in an LFSR, since it is impractical to reproduce the entire code in table format. The primitive polynomial used to generate simplex code sequences will be readily understood by the person skilled in the art.

2.9 Reed-Solomon Encoding

Data encoded by common codeword(s) is encoded using a Reed-Solomon code defined over $GF(2^4)$, $GF(2^5)$ or $GF(2^6)$. The code has a natural length n of 15, 31 or 63, respectively. The dimension k of the code is chosen to balance the error correcting capacity and data capacity of the code, which are (n−k)/2 and k symbols respectively.

The code may be punctured, by removing high-order redundancy symbols, to obtain a code with reduced length and reduced error correcting capacity. The code may also be shortened, by replacing high-order data symbols with zeros, to obtain a code with reduced length and reduced data capacity. Both puncturing and shortening can be used to obtain a code with particular parameters. Shortening is preferred, where possible, since this avoids the need for erasure decoding. For example, some of the Reed-Solomon codes described in Table 4 are shortened and/or punctured codes.

The code has one of the following primitive polynomials, respectively:

$$p_4(x) = x^4 + x + 1$$

$$p_5(x) = x^5 + x^2 + 1$$

$$p_6(x) = x^6 + x + 1$$

The code has the following generator polynomial:

$$g(x) = \prod_{i=1}^{n-k} (x + \alpha^i)$$

For a detailed description of Reed-Solomon codes, refer to Wicker, S. B. and V. K. Bhargava, eds., *Reed-Solomon Codes and Their Applications*, IEEE Press, 1994.

Figure 15:
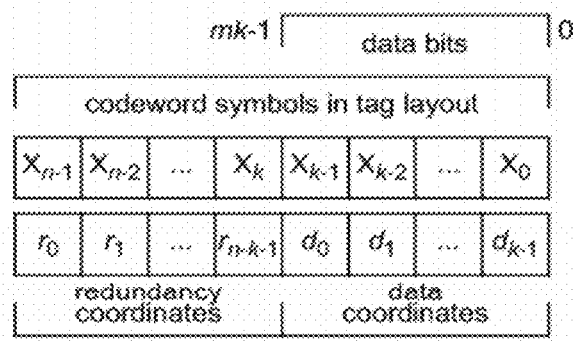
FIG. 15 shows the layout of a Reed-Solomon codeword.

As shown in FIG. 15, redundancy coordinates $r_i$ and data coordinates $d_i$ of the code are indexed from left to right according to the power of their corresponding polynomial terms. The symbols $X_i$ of a complete codeword are indexed from right to left to match the bit order of the data. The bit order within each symbol is the same as the overall bit order.

The region ID is protected by a 16-bit cyclic redundancy check (CRC). This provides an added layer of error detection after Reed-Solomon error correction, in case a codeword containing a part of the region ID is mis-corrected.

The CRC has the following generator polynomial:

$$g(x) = x^{16} + x^{12} + x^5 + 1$$

The CRC is initialized to 0xFFFF. The most significant bit of the region ID is treated as the most significant coefficient of the data polynomial.

2.10 Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags and is defined to be the centre of the top left target. The origin of a particular tag pattern is therefore the centre of the top left target of the tag that encodes coordinate pair (0,0).

The surface coding is optionally displaced from its nominal position relative to the surface by an amount derived from the region ID. This ensures that the utilisation of a pagewidth digital printhead used to print the surface coding is uniform. The displacement of the surface coding is negative, hence the displacement of the region described by the surface coding is positive relative to the surface coding. The magnitude of the displacement is the region ID modulo the width of the tag in 1600 dpi dots (i.e. 240). To accommodate non-1600 dpi printers the actual magnitude of the displacement may vary from its nominal value by up to half the dot pitch of the printer.

2.11 Tag Information Content

2.11.1 Field Definitions

Table 6 defines the information fields embedded in the surface coding.

TABLE 6

Field Definitions

| field | description |
|---|---|
| unique to tag | |
| active area flag | A flag indicating whether the area[a] immediately surrounding a tag intersects an active area. |
| x coordinate | The unsigned x coordinate of the tag[b]. |
| y coordinate | The unsigned y coordinate of the tag[b]. |
| common to tagged region | |
| encoding format | The format of the encoding. 0: the present encoding. Other values are reserved |
| region flags | Flags controlling the interpretation of region data (see Table 7). |
| macrodot size ID | The ID of the macrodot size. |
| region ID | The ID of the region containing the tags. |
| secret-key signature | An optional secret-key signature of the region. |
| CRC (Cyclic Redundancy Check) | A CRC of region ID (see Section 2.9). |

[a]the diameter of the area, centered on the tag, is nominally 2.5 times the diagonal size of the tag; this is to accommodate the worst-case distance between the nib position and the imaged tag An active area is an area within which any captured input should be immediately forwarded to the corresponding Netpage server 10 for interpretation. This also allows the Netpage server 10 to signal to the user that the input has had an immediate effect. Since the server has access to precise region definitions, any active area indication in the surface coding can be imprecise so long as it is inclusive.

TABLE 7

Region flags

| bit | meaning |
|---|---|
| 0 | Region is interactive, i.e. x and y-coordinates are present. |
| 1 | Region is active, i.e. the entire region is an active area. Otherwise active areas are identified by individual tags' active area flags. |
| 2 | Region ID is not serialized[a]. |
| 3 | Region has secret-key signature (see Section 2.13) |
| 4 | Region has embedded data. |
| 5 | Embedded data is a public-key signature (see Sections 2.12 and 2.13). |
| 6 | Region has long coordinates[b]. |
| 7 | Region has a long region ID[c]. |
| 8 | Region ID is an EPC. |
| 9 | Region is displaced according to region ID (see Section 2.10) |

[a]For an EPC this means that the serial number is replaced by a layout number, to allow the package design associated with a product to vary over time (see US 2007/0108285, the contents of which is herein incorporated by reference).
[b]Hence the X and Y Reed-Solomon codewords have less redundancy.
[c]Hence, the B, C and D Reed-Solomon codewords have less redundancy.

Codeword E (when present) either contains a data fragment or a secret-key signature. These are described in Section 2.12 and Section 2.13 respectively. The secret-key signature is present in a particular tag if the <region has secret-key signature> flag in the region flags is set, and the tag's active area flag is set. The data fragment is present in a particular tag if the <region contains embedded data> flag in the region flags is set and the tag does not already contain a secret-key signature.

When the region flags indicate that a particular codeword is absent, then the codeword is not coded in the tag pattern, i.e. there are no macrodots representing the codeword. This applies to the X, Y and E codewords i.e. the X and Y codewords are present if the <region is interactive> flag in the region flags is set. The E codeword is present if a secret-key signature or data fragment is present.

2.12 Embedded Data Object

If the <region has embedded data> flag in the region flags is set then the surface coding contains embedded data. The embedded data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 8, each block may have a data capacity of 176-bits. The block data is encoded in the data fragments of a contiguous group of six tags arranged in a 3×2 rectangle.

The block parameters are as defined in Table 8. The E codeword of each tag may encode a fragment of the embedded data.

TABLE 8

Block parameters

| parameter | value | description |
|---|---|---|
| w | 3 | The width of the block, in tags |
| h | 2 | The height of the block, in tags. |
| b | 176 | The data capacity of the block, in bits |

If the E codeword of a particular tag does not contain a fragment of the embedded data, then the pen 400 can discover this implicitly by the failure of the codeword to decode, or explicitly from the tag's active area flag.

Data of arbitrary size may be encoded into a superblock consisting of a contiguous set of blocks, typically arranged in a rectangle. The size of the superblock may be encoded in each block.

The superblock is replicated in the surface coding as many times as it will fit, including partially along the edges of the surface coding.

The data encoded in the superblock may include, for example, more precise type information, more precise size information, and more extensive error detection and/or correction data.

2.13 Digital Signatures

If the <region has a secret-key signature> flag in the region flags is set, then the region has a secret-key digital signature. In an online environment the secret-key signature can be verified, in conjunction with the region ID, by querying a server with knowledge of the secret-key signature or the corresponding secret key.

If the region contains embedded data and the <embedded data is a public-key signature> flag in the region flag is set, then the surface coding contains an embedded public-key digital signature of the region ID.

In an online environment any number of signature fragments can be used, in conjunction with the region ID and optionally the secret-key signature, to validate the public-key signature by querying a server with knowledge of the full public-key signature or the corresponding private key.

The actual length and type of the signature are determined from the region ID during signature verification i.e. typically from a previously-retrieved digital signature associated with a sequence of region IDs.

Digital signature verification is discussed in the Applicant's US Publication No. 2007/0108285, the contents of which are herein incorporated by reference.

2.14 Tag Imaging and Decoding

The minimum imaging field of view required to guarantee acquisition of data from an entire tag 4B has a diameter of 33.9 s (i.e. $((2 \times 10)+4)\sqrt{2}$ s), allowing for arbitrary rotation and translation of the surface coding in the field of view. Notably, the imaging field of view does not have to be large enough to guarantee capture of an entire tag—the arrangement of the data symbols within each tag ensures that a any square portion of length (l+4 s) captures the requisite information in full from spatially coherent samples, irrespective of whether a whole tag is actually visible in the field-of-view. As used herein, l is defined as the length of a tag.

In terms of imaging the coding pattern, the imaging field-of-view is typically a circle. Accordingly, the imaging field-of-view should preferably have diameter of at least $(l+4 s)\sqrt{2}$ and less than two tag diameters. Importantly, the field-of-view is not required to be at least two tag diameters, in contrast with prior art tag designs, because it is not essential in the present invention to capture an entire tag in the field of view.

The extra four macrodot units ensure that pulse-position modulated values can be decoded from spatially coherent samples i.e. from whole symbols rather than partial symbols at opposite sides of the imaging field of view.

By analogy, the minimum imaging field of view required to guarantee acquisition of data from an entire tag 4A has a diameter of 48.1 s (i.e. $((3 \times 10)+4)\sqrt{2}$ s).

In the present context, a "tag diameter" is given to mean the length of a tag diagonal.

Figure 16:
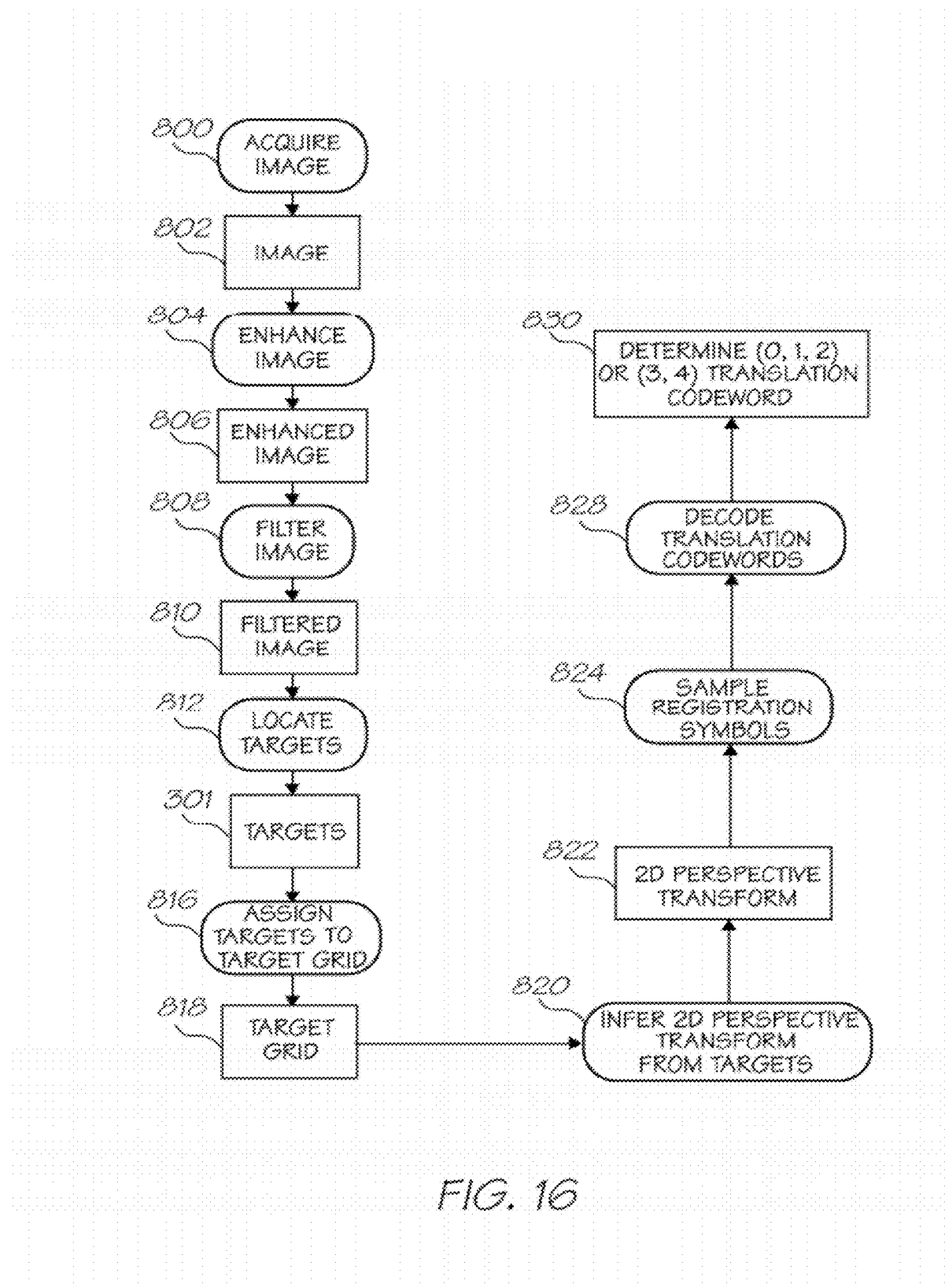
FIG. 16 is a flowchart of initial image processing by the Netpage pen.

FIG. 16 shows a tag image processing and decoding process flow up to the stage of sampling registration symbols and decoding the translation codewords. Firstly, a raw image 802 of the tag pattern is acquired (at 800), for example via an image sensor such as a CCD image sensor, CMOS image sensor, or a scanning laser and photodiode image sensor. The raw image 802 is then typically enhanced (at 804) to produce an enhanced image 806 with improved contrast and more uniform pixel intensities. Image enhancement may include global or local range expansion, equalization, and the like. The enhanced image 806 is then typically filtered (at 808) to produce a filtered image 810. Image filtering may consist of low-pass filtering, with the low-pass filter kernel size tuned to obscure macrodots 302 but to preserve targets 301. The filtering step 808 may include additional filtering (such as edge detection) to enhance target features 301. Encoding of data symbols 304 using pulse position modulation (PPM) provides a more uniform coding pattern 3 than simple binary dot encoding (as described in, for example, U.S. Pat. No. 6,832, 717). Advantageously, this helps separate targets 301 from data areas, thereby allowing more effective low-pass filtering of the PPM-encoded data compared to binary-coded data.

Following low-pass filtering, the filtered image 810 is then processed (at 812) to locate the targets 301. This may consist of a search for target features whose spatial inter-relationship is consistent with the known geometry of the tag pattern (i.e. targets positioned at the corners of square cells). Candidate targets may be identified directly from maxima in the filtered image 810, or may be the subject of further characterization and matching, such as via their (binary or grayscale) shape moments (typically computed from pixels in the enhanced image 806 based on local maxima in the filtered image 810), as described in U.S. Pat. No. 7,055,739, the contents of which is herein incorporated by reference.

The identified targets 301 are then assigned (at 816) to a target grid 818. Each cell of the grid 818 contains a symbol group 303, and several symbol groups will of course be visible in the image. At this stage, individual tags 4 will not be identifiable in the target grid 818, since the targets 301 do not themselves demarcate one tag from another.

To allow macrodot values to be sampled accurately, the perspective transform of the captured image must be inferred. Four of the targets 301 are taken to be the perspective-distorted corners of a square of known size in tag space, and the eight-degree-of-freedom perspective transform 822 is inferred (at 820), based on solving the well-understood equations relating the four tag-space and image-space point pairs. Calculation of the 2D perspective transform is described in detail in, for example, Applicant's U.S. Pat. No. 6,832,717, the contents of which is herein incorporated by reference.

Since each image will typically contain at least 9 targets arranged in a square grid, the accuracy of calculating the 2D perspective transform is improved compared to the Applicant's previous tag designs described in, for example, U.S. Pat. No. 6,832,717.

The inferred tag-space to image-space perspective transform 822 is used to project each known macrodot position in tag space into image space. Since all bits in the tags are represented by PPM-encoding, the presence or absence of each macrodot 302 can be determined using a local intensity reference, rather than a separate intensity reference. Thus, PPM-encoding provides improved data sampling compared with pure binary encoding.

The next stage determines a type of position-coding pattern being imaged by the pen 400 from a translation codeword. In other words, this stage distinguishes a first position-coding pattern containing tags 4A (3×3) from a second position-coding pattern containing tags 4B (2×2) for subsequent sampling and decoding.

Two or more orthogonal registration symbols ('VRS' and 'HRS') are sampled (at 824), to allow decoding of the orthogonal translation codewords and the orthogonal direction codewords. A flag symbol value may also be decoded subsequently from the decoded registration symbols.

Decoding of the orthogonal translation codewords (at 828) yields either a (0, 1, 2) translation codeword or a (3, 4) translation codeword (at 830).

Figure 17:
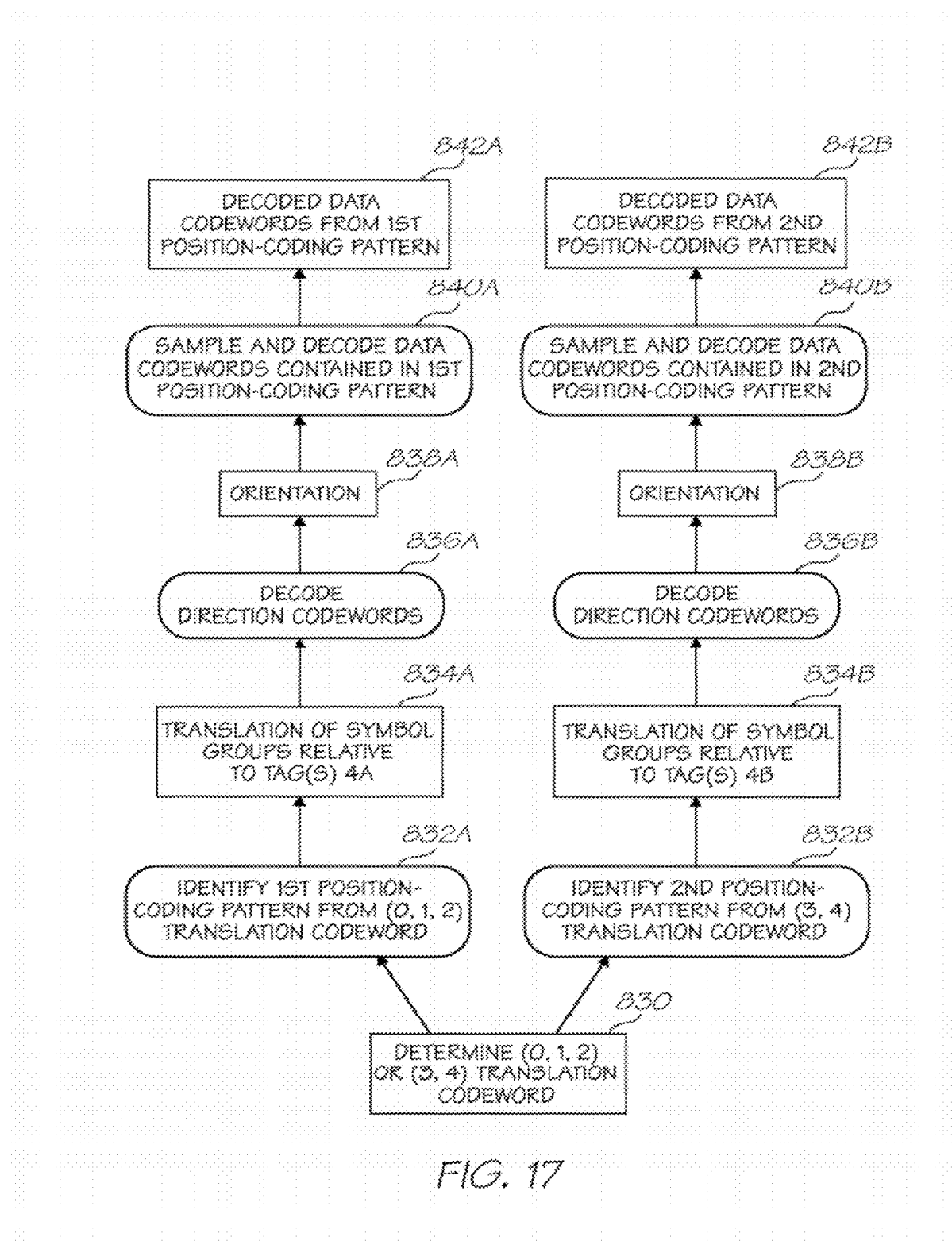
FIG. 17 is a flowchart of codeword decoding subsequent to the initial image processing.

Referring now to FIG. 17, the (0, 1, 2) translation codeword indicates nine symbol groups per tag, thereby identifying (at 832A) the imaged position-coding pattern as containing tags 4A. Alternatively, the (3, 4) translation codeword indicates four symbol groups per tag, thereby identifying (at 832B) the imaged position-coding pattern as containing tags 4B.

Once the position-coding pattern has been identified at 832A or 832B, subsequent sampling and decoding proceeds in accordance with the position-coding pattern thus identified. Accordingly, the decoded orthogonal translation codewords are used to determine the translation of tags(s) in the field of view relative to the target grid 818. This enables alignment of the tags 4A or 4B with the target grid 818, thereby allowing individual tag(s), or portions thereof, to be distinguished in the coding pattern 3 in the field of view. In the first case, the tags 4A (each containing nine symbol groups) are aligned (at 834A) with the target grid 818. In the second case, the tags 4B (each containing four symbol groups) are aligned (at 834B) with the target grid 818.

Since each symbol group 303 contains orthogonal registration symbols, multiple translation codes can be decoded to provide robust translation determination. As described in Section 2.6, the translation code is a cyclic position code. Since each row and each column of a tag contains M symbol groups, the code has minimum distance M×M. This allows robust determination of the alignment of tags 4A or 4B with the target grid 818. The alignment needs to be both robust and accurate since there are many possible alignments when each tag contains multiple symbol groups 303.

After the translation of symbol groups 303 relative to tags 4A or 4B has been determined, then at least two orthogonal direction codes are decoded (at 836A or 836B) to provide the orientation 838A or 838B. As described in Section 2.6, since N vertical registration symbols in a tag form a vertical direction code with minimum distance N, the vertical direction code is capable of correcting $(N-1)/2$ errors. The horizontal direction code is similarly capable of correcting $(N-1)/2$ errors using N horizontal registration symbols. Hence, orientation determination is very robust and capable of correcting errors, depending on the number of registration symbols sampled.

Once initial imaging and decoding has yielded the 2D perspective transform, the orientation, and the translation of tag(s) relative to the target grid, the data codewords can then be sampled and decoded (at 840A or 840B) to yield the requisite decoded codewords 842A or 842B.

For example, decoding of data codewords from a tag 4B may proceed as follows:
    sample and decode common Reed-Solomon codeword (A)
    determine encoding format, and reject unknown encoding
    on decode error flag bad format sample
    determine region ID Reed-Solomon codeword format from region flags
    verify CRC of region ID
    on decode error flag bad region ID sample
    detect any erroneous symbols in region ID Reed-Solomon common codeword
    determine region ID sample and decode x and y coordinate Reed-Solomon codewords (X and Y), treating any coordinate symbols co-encoded with the detected erroneous symbols as erasures determine tag x-y location from codewords determine nib x-y location from tag x-y location and perspective transform taking into account macrodot size (from macrodot size ID)

encode region ID and nib x-y location in digital ink ("interaction data")

In practice, when decoding a sequence of images of a tag pattern, it is useful to exploit inter-frame coherence to obtain greater effective redundancy.

Region ID decoding need not occur at the same rate as position decoding.

The skilled person will appreciate that the decoding sequence described above represents one embodiment of the present invention, based on a simple coding pattern containing only one common codeword (A) encoding the region ID. However, it will, of course, be appreciated that the interaction data sent from the pen 400 to the netpage system may include other data e.g. digital signature (see Section 2.13), pen mode (see US 2007/125860 incorporated herein by reference), orientation data, force data, pen ID, nib ID etc.

An example of interpreting interaction data, received by the netpage system from the netpage pen 400, is discussed briefly above in Section 1. A more detailed discussion of how the netpage system may interpret interaction data can be found in the Applicant's previously-filed applications (see, for example, US 2007/130117 and US 2007/108285, the contents of which are herein incorporated by reference).

3. Netpage Pen 3.1 Functional Overview

The active sensing device of the netpage system may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). For a description of various netpage sensing devices, reference is made to U.S. Pat. No. 7,105,753; U.S. Pat. No. 7,015,901; U.S. Pat. No. 7,091,960; and US Publication No. 2006/0028459, the contents of each of which are herein incorporated by reference.

It will be appreciated that the present invention may utilize any suitable optical reader. However, the Netpage pen 400 will be described herein as one such example.

The Netpage pen 400 is a motion-sensing writing instrument which works in conjunction with a tagged Netpage surface (see Section 2). The pen incorporates a conventional ballpoint pen cartridge for marking the surface, an image sensor and processor for simultaneously capturing the absolute path of the pen on the surface and identifying the surface, a force sensor for simultaneously measuring the force exerted on the nib, and a real-time clock for simultaneously measuring the passage of time.

While in contact with a tagged surface, as indicated by the force sensor, the pen continuously images the surface region adjacent to the nib, and decodes the nearest tag in its field of view to determine both the identity of the surface, its own instantaneous position on the surface and the pose of the pen. The pen thus generates a stream of timestamped position samples relative to a particular surface, and transmits this stream to the Netpage server 10. The sample stream describes a series of strokes, and is conventionally referred to as digital ink (DInk). Each stroke is delimited by a pen down and a pen up event, as detected by the force sensor. More generally, any data resulting from an interaction with a Netpage, and transmitted to the Netpage server 10, is referred to herein as "interaction data".

The pen samples its position at a sufficiently high rate (nominally 100 Hz) to allow a Netpage server to accurately reproduce hand-drawn strokes, recognise handwritten text, and verify hand-written signatures.

The Netpage pen also supports hover mode in interactive applications. In hover mode the pen is not in contact with the paper and may be some small distance above the surface of the paper (or other substrate). This allows the position of the pen, including its height and pose to be reported. In the case of an interactive application the hover mode behaviour can be used to move a cursor without marking the paper, or the distance of the nib from the coded surface could be used for tool behaviour control, for example an air brush function.

The pen includes a Bluetooth radio transceiver for transmitting digital ink via a relay device to a Netpage server. When operating offline from a Netpage server the pen buffers captured digital ink in non-volatile memory. When operating online to a Netpage server the pen transmits digital ink in real time.

The pen is supplied with a docking cradle or "pod". The pod contains a Bluetooth to USB relay. The pod is connected via a USB cable to a computer which provides communications support for local applications and access to Netpage services.

The pen is powered by a rechargeable battery. The battery is not accessible to or replaceable by the user. Power to charge the pen can be taken from the USB connection or from an external power adapter through the pod. The pen also has a power and USB-compatible data socket to allow it to be externally connected and powered while in use.

The pen cap serves the dual purpose of protecting the nib and the imaging optics when the cap is fitted and signalling the pen to leave a power-preserving state when uncapped.

3.2 Ergonomics and Layout

Figure 18:
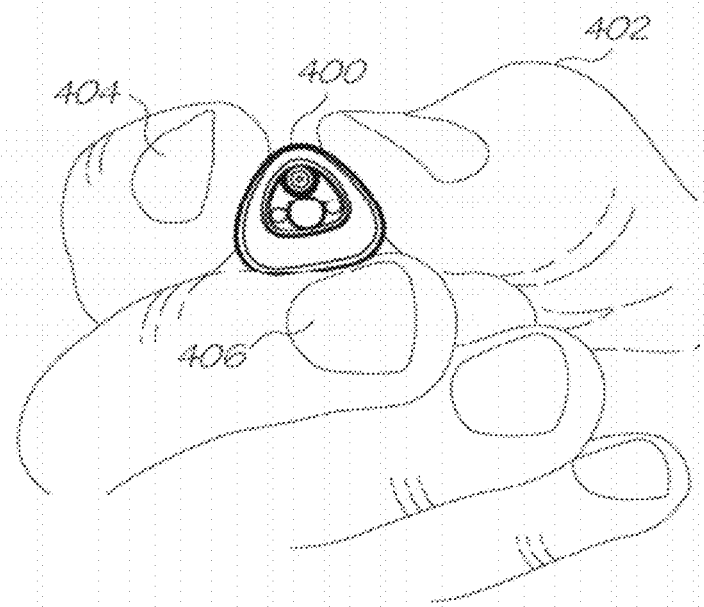
FIG. 18 shows a nib and elevation of the Netpage pen held by a user.

FIG. 18 shows a rounded triangular profile gives the pen 400 an ergonomically comfortable shape to grip and use the pen in the correct functional orientation. It is also a practical shape for accommodating the internal components. A normal pen-like grip naturally conforms to a triangular shape between thumb 402, index finger 404 and middle finger 406.

Figure 19:
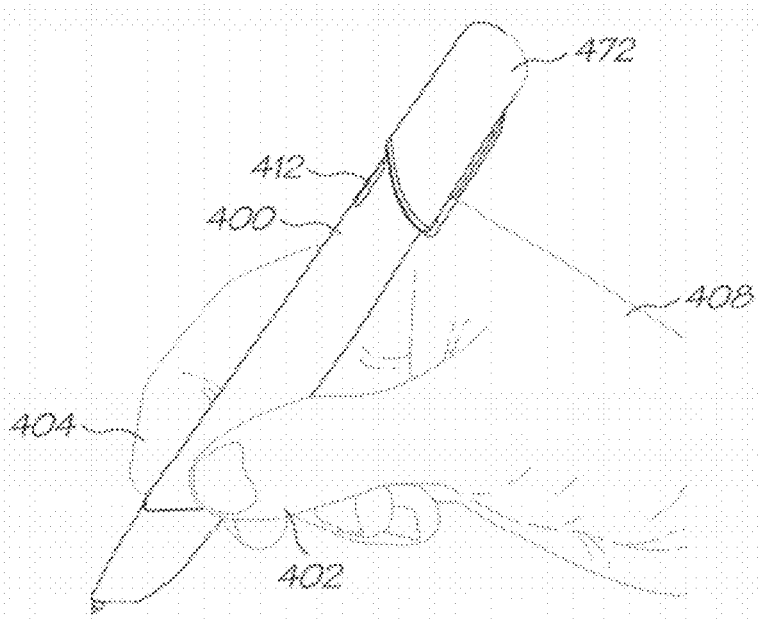
FIG. 19 shows the pen held by a user at a typical incline to a writing surface.

As shown in FIG. 19, a typical user writes with the pen 400 at a nominal pitch of about 30 degrees from the normal toward the hand 408 when held (positive angle) but seldom operates a pen at more than about 10 degrees of negative pitch (away from the hand). The range of pitch angles over which the pen 400 is able to image the pattern on the paper has been optimised for this asymmetric usage. The shape of the pen 400 helps to orient the pen correctly in the user's hand 408 and to discourage the user from using the pen "upside-down". The pen functions "upside-down" but the allowable tilt angle range is reduced.

The cap 410 is designed to fit over the top end of the pen 400, allowing it to be securely stowed while the pen is in use. Multi colour LEDs illuminate a status window 412 in the top edge (as in the apex of the rounded triangular cross section) of the pen 400 near its top end. The status window 412 remains un-obscured when the cap is stowed. A vibration motor is also included in the pen as a haptic feedback system (described in detail below).

As shown in FIG. 20, the grip portion of the pen has a hollow chassis molding 416 enclosed by a base molding 528 to house the other components. The ink cartridge 414 for the ball point nib (not shown) fits naturally into the apex 420 of the triangular cross section, placing it consistently with the user's grip. This in turn provides space for the main PCB 422 in the centre of the pen and for the battery 424 in the base of the pen. By referring to FIG. 21A, it can be seen that this also naturally places the tag-sensing optics 426 unobtrusively below the nib 418 (with respect to nominal pitch). The nib molding 428 of the pen 400 is swept back below the ink cartridge 414 to prevent contact between the nib molding 428 and the paper surface when the pen is operated at maximum pitch.

As best shown in FIG. 21B, the imaging field of view 430 emerges through a centrally positioned IR filter/window 432 below the nib 418, and two near-infrared illumination LEDs 434, 436 emerge from the two bottom corners of the nib molding 428. Each LED 434, 436 has a corresponding illumination field 438, 440.

As the pen is hand-held, it may be held at an angle that causes reflections from one of the LED's that are detrimental to the image sensor. By providing more than one LED, the LED causing the offending reflections can be extinguished.

Specific details of the pen mechanical design can be found in US Publication No. 2006/0028459, the contents of which are herein incorporated by reference.

3.3 Pen Feedback Indications

FIG. 22 is a longitudinal cross section through the centre-line if the pen 400 (with the cap 410 stowed on the end of the pen). The pen incorporates red and green LEDs 444 to indicate several states, using colours and intensity modulation. A light pipe 448 on the LEDs 444 transmit the signal to the status indicator window 412 in the tube molding 416. These signal status information to the user including power-on, battery level, untransmitted digital ink, network connection on-line, fault or error with an action, detection of an "active area" flag, detection of an "embedded data" flag, further data sampling to required to acquire embedded data, acquisition of embedded data completed etc.

A vibration motor 446 is used to haptically convey information to the user for important verification functions during transactions. This system is used for important interactive indications that might be missed due to inattention to the LED indicators 444 or high levels of ambient light. The haptic system indicates to the user when:

The pen wakes from standby mode
There is an error with an action
To acknowledge a transaction 3.4 Pen Optics The pen incorporates a fixed-focus narrowband infrared imaging system. It utilizes a camera with a short exposure time, small aperture, and bright synchronised illumination to capture sharp images unaffected by defocus blur or motion blur.

TABLE 9

| Optical Specifications | |
|---|---|
| Magnification | ⁻0.225 |
| Focal length of lens | 6.0 mm |
| Viewing distance | 30.5 mm |
| Total track length | 41.0 mm |
| Aperture diameter | 0.8 mm |
| Depth of field | ⁻/⁺6.5 mm |
| Exposure time | 200 us |
| Wavelength | 810 nm |
| Image sensor size | 140 × 140 pixels |
| Pixel size | 10 um |
| Pitch range | ⁻15 to. 45 deg |
| Roll range | ⁻30 to. 30 deg |
| Yaw range | 0 to 360 deg |

TABLE 9-continued

| Optical Specifications | |
|---|---|
| Minimum sampling rate | 2.25 pixels per macrodot |
| Maximum pen velocity | 0.5 m/s |

[1]Allowing 70 micron blur radius
[2]Illumination and filter
[3]Pitch, roll and yaw are relative to the axis of the pen Cross sections showing the pen optics are provided in FIGS. 23A and 23B. An image of the Netpage tags printed on a surface 548 adjacent to the nib 418 is focused by a lens 488 onto the active region of an image sensor 490. A small aperture 494 ensures the available depth of field accommodates the required pitch and roll ranges of the pen 400.

First and second LEDs 434 and 436 brightly illuminate the surface 549 within the field of view 430. The spectral emission peak of the LEDs is matched to the spectral absorption peak of the infrared ink used to print Netpage tags to maximise contrast in captured images of tags. The brightness of the LEDs is matched to the small aperture size and short exposure time required to minimise defocus and motion blur.

A longpass IR filter 432 suppresses the response of the image sensor 490 to any coloured graphics or text spatially coincident with imaged tags and any ambient illumination below the cut-off wavelength of the filter 432. The transmission of the filter 432 is matched to the spectral absorption peak of the infrared ink to maximise contrast in captured images of tags. The filter also acts as a robust physical window, preventing contaminants from entering the optical assembly 470.

3.5 Pen Imaging System

Figure 24:
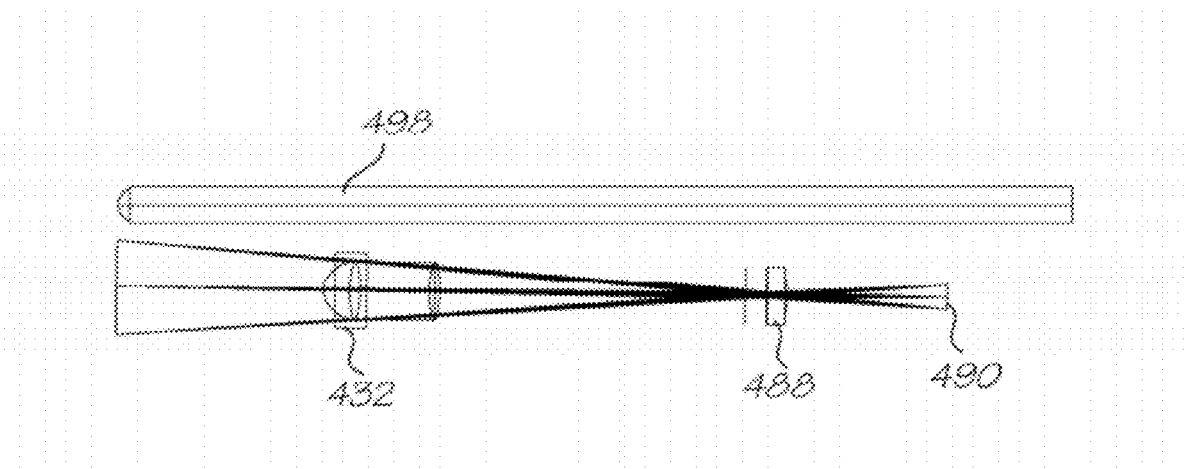
FIG. 24 is a ray trace of the pen optics adjacent a sketch of the ink cartridge.
Figure 25:
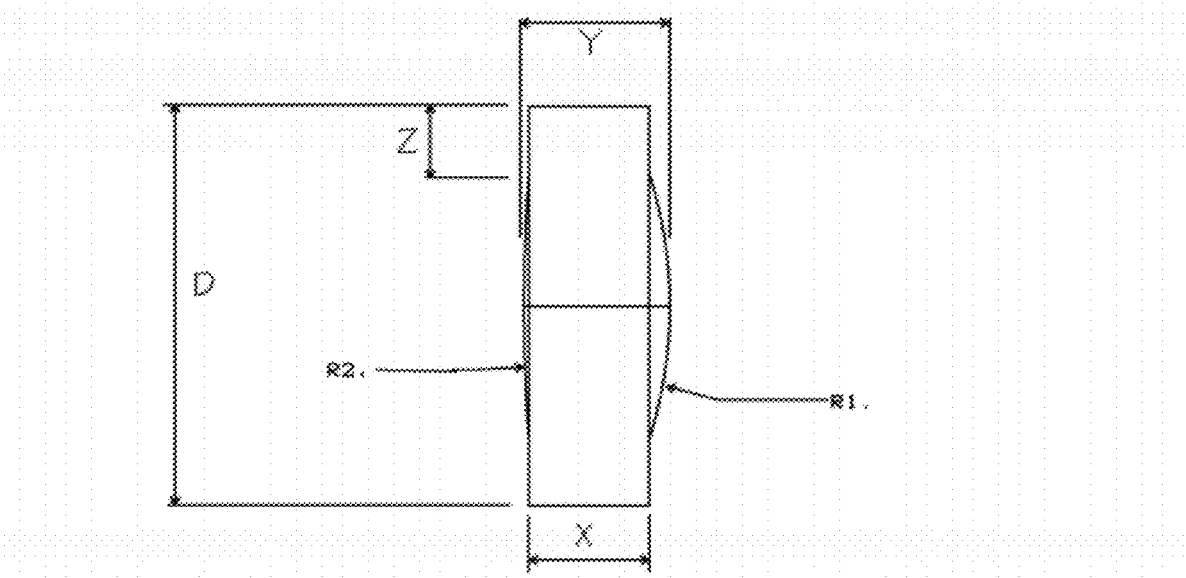
FIG. 25 is a side elevation of the lens.

A ray trace of the optic path is shown in FIG. 24. The image sensor 490 is a CMOS image sensor with an active region of 140 pixels squared. Each pixel is 10 µm squared, with a fill factor of 93%. Turning to FIG. 25, the lens 488 is shown in detail. The dimensions are:

D=3 mm
R1=3.593 mm
R2=15.0 mm
X=0.8246 mm
Y=1.0 mm
Z=0.25 mm

This gives a focal length of 6.15 mm and transfers the image from the object plane (tagged surface 548) to the image plane (image sensor 490) with the correct sampling frequency to successfully decode all images over the specified pitch, roll and yaw ranges. The lens 488 is biconvex, with the most curved surface facing the image sensor. The minimum imaging field of view 430 required to guarantee acquisition of sufficient tag data with each interaction is dependent on the specific coding pattern. The required field of view for the coding pattern of the present invention is described in Section 2.10.

The required paraxial magnification of the optical system is defined by the minimum spatial sampling frequency of 2.25 pixels per macrodot for the fully specified tilt range of the pen 400, for the image sensor 490 of 10 µm pixels. Typically, the imaging system employs a paraxial magnification of 0.225, the ratio of the diameter of the inverted image at the image sensor to the diameter of the field of view at the object plane, on an image sensor 490 of minimum 128×128 pixels. The image sensor 490 however is 140×140 pixels, in order to accommodate manufacturing tolerances. This allows up to +/−120 µm (12 pixels in each direction in the plane of the image sensor) of misalignment between the optical axis and the image sensor axis without losing any of the information in the field of view.

The lens 488 is made from Poly-methyl-methacrylate (PMMA), typically used for injection moulded optical components. PMMA is scratch resistant, and has a refractive index of 1.49, with 90% transmission at 810 nm. The lens is biconvex to assist moulding precision and features a mounting surface to precisely mate the lens with the optical barrel molding 492.

A 0.8 mm diameter aperture 494 is used to provide the depth of field requirements of the design.

The specified tilt range of the pen is 15.0 to 45.0 degree pitch, with a roll range of 30.0 to 30.0 degrees. Tilting the pen through its specified range moves the tilted object plane up to 6.3 mm away from the focal plane. The specified aperture thus provides a corresponding depth of field of/6.5 mm, with an acceptable blur radius at the image sensor of 16 µm.

Due to the geometry of the pen design, the pen operates correctly over a pitch range of 33.0 to 45.0 degrees.

Figure 26:
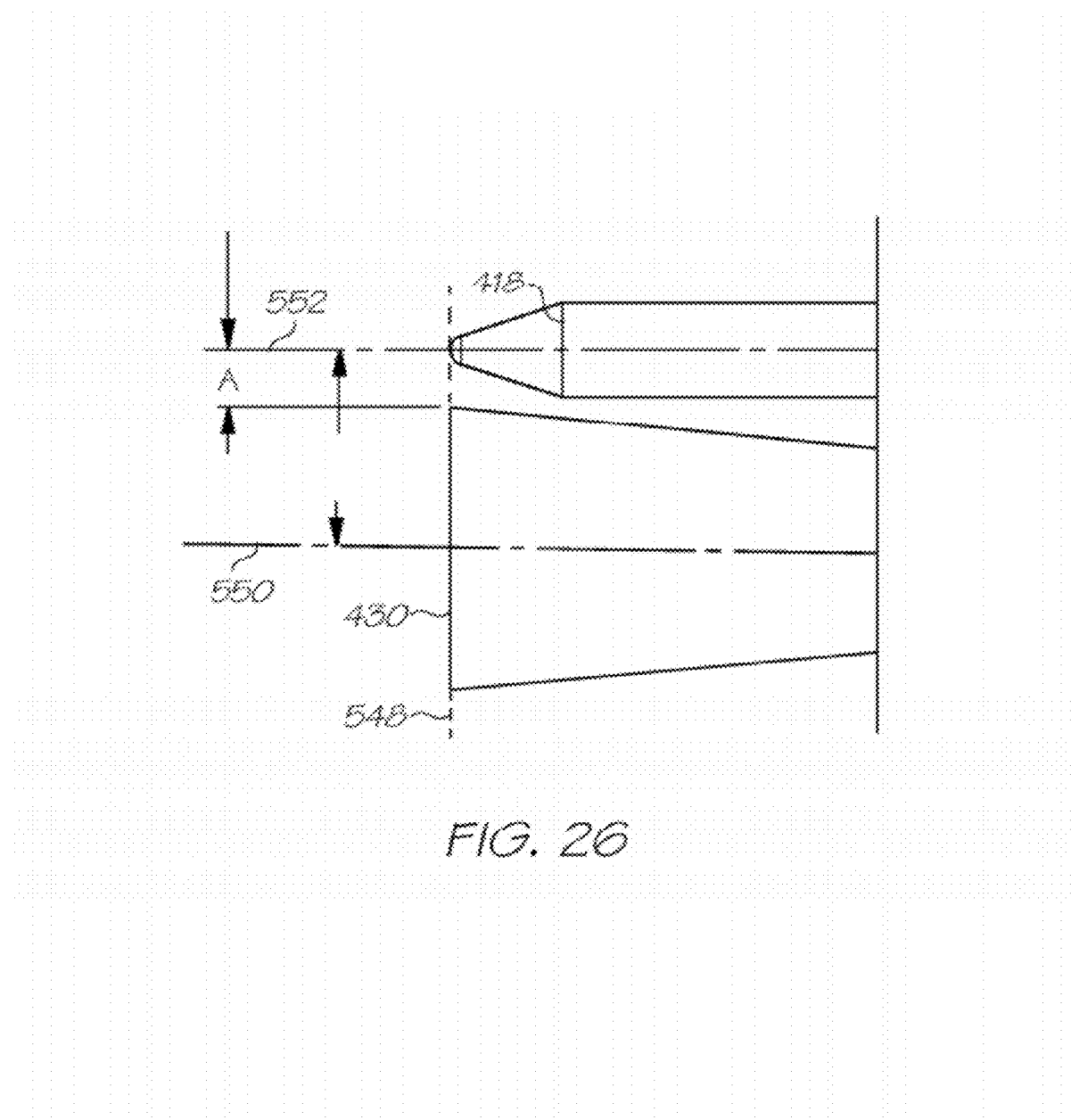
FIG. 26 is a side elevation of the nib and the field of view of the optical sensor.

Referring to FIG. 26, the optical axis 550 is pitched 0.8 degrees away from the nib axis 552. The optical axis and the nib axis converge toward the paper surface 548. With the nib axis 552 perpendicular to the paper, the distance A between the edge of the field of view 430 closest to the nib axis and the nib axis itself is 1.2 mm.

The longpass IR filter 432 is made of CR-39, a lightweight thermoset plastic heavily resistant to abrasion and chemicals such as acetone. Because of these properties, the filter also serves as a window. The filter is 1.5 mm thick, with a refractive index of 1.50. Each filter may be easily cut from a large sheet using a $CO_2$ laser cutter.

3.6 Electronics Design

TABLE 10

| Electrical Specifications | |
|---|---|
| Processor | ARM7 (Atmel AT91FR40162) running at 80 MHz with 256 kB SRAM and 2 MB flash memory |
| Digital ink storage capacity | 5 hours of writing |
| Bluetooth Compliance | 1.2 |
| USB Compliance | 1.1 |
| Battery standby time | 12 hours (cap off), >4 weeks (cap on) |
| Battery writing time | 4 hours of cursive writing (81% pen down, assuming easy offload of digital ink) |
| Battery charging time | 2 hours |
| Battery Life | Typically 300 charging cycles or 2 years (whichever occurs first) to 80% of initial capacity. |
| Battery Capacity/Type | ~340 mAh at 3.7 V, Lithium-ion Polymer (LiPo) |

Figure 27:
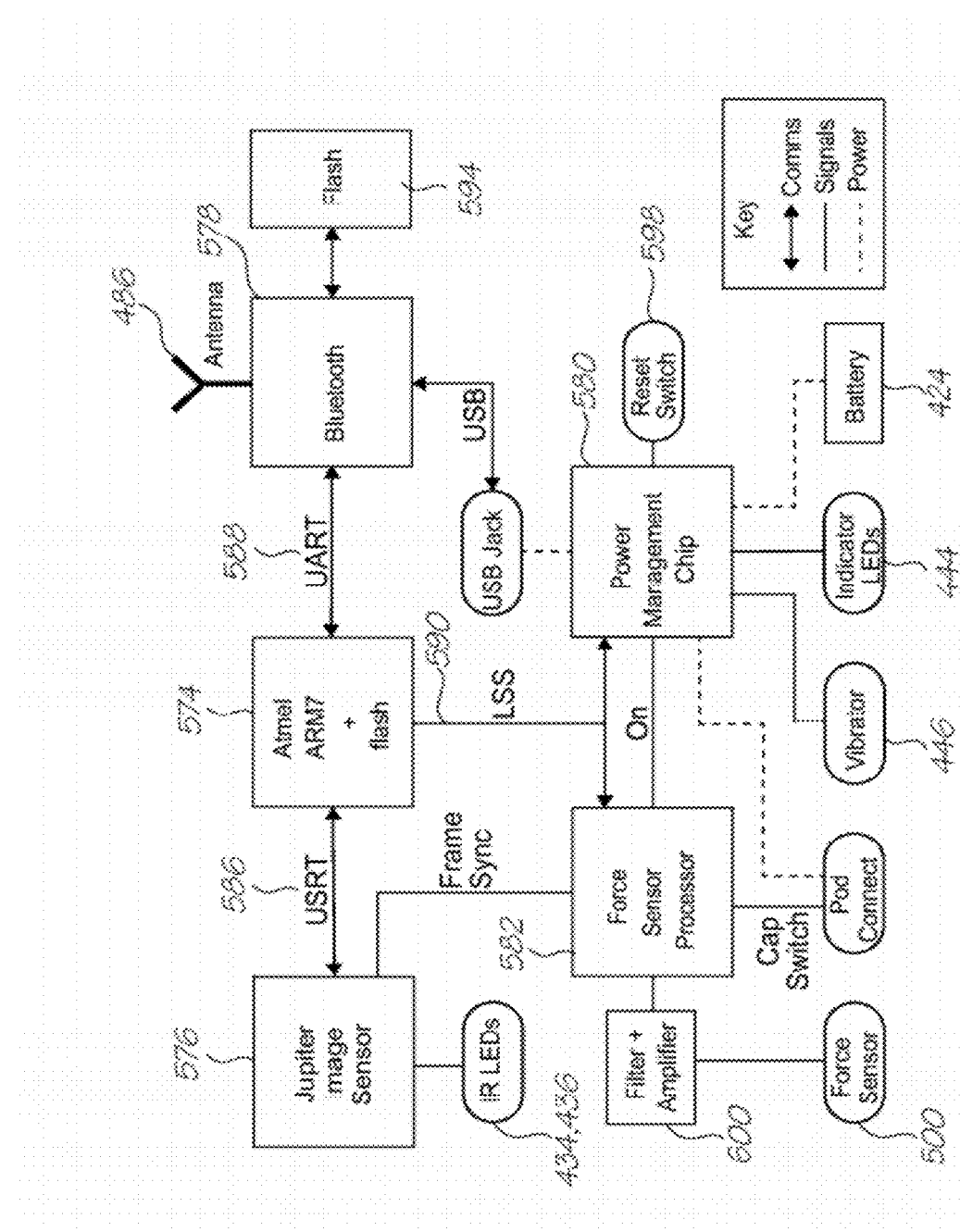
FIG. 27 is a block diagram of the pen electronics.

FIG. 27 is a block diagram of the pen electronics. The electronics design for the pen is based around five main sections. These are:
  the main ARM7 microprocessor 574,
  the image sensor and image processor 576,
  the Bluetooth communications module 578,
  the power management unit IC (PMU) 580 and
  the force sensor microprocessor 582.

3.6.1 Microprocessor

The pen uses an Atmel AT91FR40162 microprocessor (see Atmel, *AT91 ARM Thumb Microcontrollers—AT91FR40162 Preliminary*, http://www.keil.com/dd/docs/datashts/atmel/at91fr401162.pdf) running at 80 MHz. The AT91FR40162 incorporates an ARM7 microprocessor, 256 kBytes of on-chip single wait state SRAM and 2 MBytes of external flash memory in a stack chip package.

This microprocessor 574 forms the core of the pen 400. Its duties include:
  setting up the Jupiter image sensor 584,
  decoding images of Netpage coding pattern (see Section 2.14), with assistance from the image processing features of the image sensor 584, for inclusion in the digital ink stream along with force sensor data received from the force sensor microprocessor 582,
  setting up the power management IC (PMU) 580,
  compressing and sending digital ink via the Bluetooth communications module 578, and
  programming the force sensor microprocessor 582.

The ARM7 microprocessor 574 runs from an 80 MHz oscillator. It communicates with the Jupiter image sensor 576 using a Universal Synchronous Receiver Transmitter (USRT) 586 with a 40 MHz clock. The ARM7 574 communicates with the Bluetooth module 578 using a Universal Asynchronous Receiver Transmitter (UART) 588 running at 115.2 kbaud. Communications to the PMU 580 and the Force Sensor microprocessor (FSP) 582 are performed using a Low Speed Serial bus (LSS) 590. The LSS is implemented in software and uses two of the microprocessor's general purpose IOs.

The ARM7 microprocessor 574 is programmed via its JTAG port.

3.6.2 Image Sensor

The 'Jupiter' Image Sensor 584 (see US Publication No. 2005/0024510, the contents of which are incorporated herein by reference) contains a monochrome sensor array, an analogue to digital converter (ADC), a frame store buffer, a simple image processor and a phase lock loop (PLL). In the pen, Jupiter uses the USRT's clock line and its internal PLL to generate all its clocking requirements. Images captured by the sensor array are stored in the frame store buffer. These images are decoded by the ARM7 microprocessor 574 with help from the 'Callisto' image processor contained in Jupiter. The Callisto image processor performs, inter alia, low-pass filtering of captured images (see Section 2.14 and US Publication No. 2005/0024510) before macrodot sampling and decoding by the microprocessor 574.

Jupiter controls the strobing of two infrared LEDs 434 and 436 at the same time as its image array is exposed. One or other of these two infrared LEDs may be turned off while the image array is exposed to prevent specular reflection off the paper that can occur at certain angles.

3.6.3 Bluetooth Communications Module

The pen uses a CSR BlueCore-4-External device (see CSR, *BlueCore4-External Data Sheet rev c*, 6 Sep. 2004) as the Bluetooth controller 578. It requires an external 8 Mbit flash memory device 594 to hold its program code. The BlueCore4 meets the Bluetooth v1.2 specification and is compliant to v0.9 of the Enhanced Data Rate (EDR) specification which allows communication at up to 3 Mbps.

A 2.45 GHz chip antenna 486 is used on the pen for the Bluetooth communications.

The BlueCore4 is capable of forming a UART to USB bridge. This is used to allow USB communications via data/power socket 458 at the top of the pen 456.

Alternatives to Bluetooth include wireless LAN and PAN standards such as IEEE 802.11 (Wi-Fi) (see IEEE, 802.11 *Wireless Local Area Networks*, http://grouper.ieee.org/groups/802/11/index.html), IEEE 802.15 (see IEEE, 802.15 *Working Group for WPAN*, http://grouper.ieee.org/groups/802/15/index.html), ZigBee (see ZigBee Alliance, http://www.zigbee.org), and WirelessUSB Cypress (see *WirelessUSB LR 2.4-GHz DSSS Radio SoC*, http://www.cypress.com/cfuploads/img/products/cywusb6935.pdf), as well as mobile standards such as GSM (see GSM Association, http://www.gsmworld.com/index.shtml), GPRS/EDGE, *GPRS Platform*, http://www.gsmworld.com/technology/gprs/index.shtml), CDMA (see CDMA Development Group, http://www.cdg.org/, and Qualcomm, http://www.qualcomm.com), and UMTS (see 3rd Generation Partnership Project (3GPP), http://www.3gpp.org)

3.6.4 Power Management Chip The pen uses an Austria Microsystems AS3603 PMU 580 (see Austria Microsystems, AS3603 *Multi-Standard Power Management Unit Data Sheet* v2.0). The PMU is used for battery management, voltage generation, power up reset generation and driving indicator LEDs and the vibrator motor.

The PMU 580 communicates with the ARM7 microprocessor 574 via the LSS bus 590.

3.6.5 Force Sensor Subsystem

The force sensor subsystem comprises a custom Hokuriku force sensor 500 (based on Hokuriku, *HFD-500 Force Sensor*, http://www.hdk.co.jp/pdf/eng/e1381AA.pdf), an amplifier and low pass filter 600 implemented using op-amps and a force sensor microprocessor 582.

The pen uses a Silicon Laboratories C8051F330 as the force sensor microprocessor 582 (see Silicon Laboratories, *C8051F330/1 MCU Data Sheet*, rev 1.1). The C8051F330 is an 8051 microprocessor with on chip flash memory, 10 bit ADC and 10 bit DAC. It contains an internal 24.5 MHz oscillator and also uses an external 32.768 kHz tuning fork.

The Hokuriku force sensor 500 is a silicon piezoresistive bridge sensor. An op-amp stage 600 amplifies and low pass (anti-alias) filters the force sensor output. This signal is then sampled by the force sensor microprocessor 582 at 5 kHz.

Alternatives to piezoresistive force sensing include capacitive and inductive force sensing (see Wacom, "Variable capacity condenser and pointer", US Patent Application 20010038384, filed 8 Nov. 2001, and Wacom, Technology, http://www.wacom-components.com/english/tech.asp).

The force sensor microprocessor 582 performs further (digital) filtering of the force signal and produces the force sensor values for the digital ink stream. A frame sync signal from the Jupiter image sensor 576 is used to trigger the generation of each force sample for the digital ink stream. The temperature is measured via the force sensor microprocessor's 582 on chip temperature sensor and this is used to compensate for the temperature dependence of the force sensor and amplifier. The offset of the force signal is dynamically controlled by input of the microprocessor's DAC output into the amplifier stage 600.

The force sensor microprocessor 582 communicates with the ARM7 microprocessor 574 via the LSS bus 590. There are two separate interrupt lines from the force sensor microprocessor 582 to the ARM7 microprocessor 574. One is used to indicate that a force sensor sample is ready for reading and the other to indicate that a pen down/up event has occurred.

The force sensor microprocessor flash memory is programmed in-circuit by the ARM7 microprocessor 574.

The force sensor microprocessor 582 also provides the real time clock functionality for the pen 400. The RTC function is performed in one of the microprocessor's counter timers and runs from the external 32.768 kHz tuning fork. As a result, the force sensor microprocessor needs to remain on when the cap 472 is on and the ARM7 574 is powered down. Hence the force sensor microprocessor 582 uses a low power LDO separate from the PMU 580 as its power source. The real time clock functionality includes an interrupt which can be programmed to power up the ARM7 574.

The cap switch 602 is monitored by the force sensor microprocessor 582. When the cap assembly 472 is taken off (or there is a real time clock interrupt), the force sensor microprocessor 582 starts up the ARM7 572 by initiating a power on and reset cycle in the PMU 580.

3.7 Pen Software

The Netpage pen software comprises that software running on microprocessors in the Netpage pen 400 and Netpage pod.

The pen contains a number of microprocessors, as detailed in Section 3.6. The Netpage pen software includes software running on the Atmel ARM7 CPU 574 (hereafter CPU), the Force Sensor microprocessor 582, and also software running in the VM on the CSR BlueCore Bluetooth module 578 (hereafter pen BlueCore). Each of these processors has an associated flash memory which stores the processor specific software, together with settings and other persistent data. The pen BlueCore 578 also runs firmware supplied by the module manufacturer, and this firmware is not considered a part of the Netpage pen software.

The pod contains a CSR BlueCore Bluetooth module (hereafter pod BlueCore). The Netpage pen software also includes software running in the VM on the pod BlueCore.

As the Netpage pen 400 traverses a Netpage tagged surface 548, a stream of correlated position and force samples are produced. This stream is referred to as DInk. Note that DInk may include samples with zero force (so called "Hover DInk") produced when the Netpage pen is in proximity to, but not marking, a Netpage tagged surface.

The CPU component of the Netpage pen software is responsible for DInk capture, tag image processing and decoding (in conjunction with the Jupiter image sensor 576), storage and offload management, host communications, user feedback and software upgrade. It includes an operating system (RTOS) and relevant hardware drivers. In addition, it provides a manufacturing and maintenance mode for calibration, configuration or detailed (non-field) fault diagnosis. The Force Sensor microprocessor 582 component of the Netpage pen software is responsible for filtering and preparing force samples for the main CPU. The pen BlueCore VM software is responsible for bridging the CPU UART 588 interface to USB when the pen is operating in tethered mode. The pen BlueCore VM software is not used when the pen is operating in Bluetooth mode.

The pod BlueCore VM software is responsible for sensing when the pod is charging a pen 400, controlling the pod LEDs appropriately, and communicating with the host PC via USB.

For a detailed description of the software modules, reference is made to US Publication No. 2006/0028459, the contents of which are herein incorporated by reference.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A substrate having a position-coding pattern disposed on a surface thereof, said position-coding pattern comprising:
a plurality of tags, each tag encoding a w-bit subsequence of a cyclic code sequence having a length n and a dimension k, said w-bit subsequence mapping to a corresponding coordinate codeword for said tag, wherein:

adjacent tags contain successive w-bit subsequences in the cyclic code sequence; n>w>k; and a given tag contains a w-bit subsequence corresponding to offset i in the cyclic code sequence, and adjacent tags on either side of said given tag contain w-bit subsequences corresponding to offsets (i+w) and (i−w) in the cyclic code sequence.

2. The substrate of claim 1, wherein said w-bit subsequence is represented by a set of coordinate data symbols in said tag, each of said coordinate data symbols containing at least one bit of the w-bit subsequence, each coordinate data symbol being represented by one or more data elements disposed on said surface.

3. The substrate of claim 1, wherein the cyclic code sequence is an m-sequence or a simplex code.

4. The substrate of claim 1, wherein the length n of said cyclic code sequence is defined as:

$$n=2^k-1.$$

5. The substrate of claim 1, wherein said position-coding pattern comprises a plurality of target elements defining a target grid, said target grid comprising a plurality of cells, each cell defining a symbol group, wherein neighboring symbol groups share target elements.

6. The substrate of claim 5, wherein each tag is square and contains a plurality of symbol groups.

7. The substrate of claim 2, wherein each coordinate data symbol is a 1-bit symbol such that w coordinate data symbols represent said w-bit subsequence.

8. The substrate of claim 2, wherein said set of coordinate data symbols is arranged in each tag such that at any square portion of the position-coding pattern of length (l+q) is guaranteed to contain a w-bit subsequence of the cyclic code sequence, said w-bit subsequence mapping to a coordinate codeword, wherein l is a length of the tag and q is a length or a width of a coordinate data symbol.

9. The substrate of claim 2, wherein each tag contains an x-coordinate codeword mapped from a first cyclic code sequence and a y-coordinate codeword mapped from a second cyclic code sequence, said x-coordinate codeword being defined by a first set of x-coordinate data symbols, and said y-coordinate codeword being defined by a second set of y-coordinate data symbols.

10. The substrate of claim 9, wherein said first set is arranged in subsets of x-coordinate data symbols and said second set is arranged in subsets of y-coordinate data symbols.

11. The substrate of claim 10, wherein each subset of x-coordinate data symbols is configured as a column containing a plurality of said x-coordinate data symbols, and each subset of y-coordinate data symbols is configured as a row containing a plurality of said y-coordinate data symbols, wherein each of said rows and columns has a maximal width v.

12. The substrate of claim 11, wherein said columns of x-coordinate symbols and said rows of y-coordinate symbols are arranged such that any square portion of said position-coding pattern of length (l+v) is guaranteed to contain a w-bit subsequence of the first cyclic code sequence and a w-bit subsequence of the second cyclic code sequence, each w-bit subsequence corresponding to an offset in its respective first or second cyclic code sequence, each w-bit subsequence mapping to at least one of:

a coordinate codeword for a tag; and a coordinate codeword for a row or column within said tag, wherein l is a length of the tag.

13. The substrate of claim 9, wherein one or more of said coordinate data symbols is a merged data symbol, each merged data symbol being represented by said one or more data elements, and wherein each merged data symbol encodes at least two of:

an x-coordinate data symbol from said first set;

a y-coordinate data symbol from said second set; and at least one further data symbol which is different from said x- and y-coordinate data symbols.

14. The substrate of claim 13, wherein said at least one further data symbol is a Reed-Solomon symbol defining a fragment of a common codeword, said common codeword being encoded by a set of Reed-Solomon symbols contained in said tag, said common codeword identifying an identity common to a plurality of contiguous tags.

15. The substrate of claim 13, wherein each merged data symbol is represented by said one or more data elements using pulse position modulation.

16. The substrate of claim 15, wherein said data elements are macrodots, and wherein each merged data symbol is represented by m macrodots, each of said macrodots occupying a respective position from a plurality of predetermined possible positions p within said merged data symbol, the respective positions of said macrodots representing one of a plurality of possible data values, wherein m is an integer value of 1 or more, and p>m.

17. The substrate of claim 13, wherein each merged data symbol encodes said x-coordinate data symbol and said y-coordinate data symbol.

18. The substrate of claim 13, wherein said x-coordinate data symbols and said y-coordinate data symbols are encoded in different merged symbols.

19. The substrate of claim 2, wherein one or more of said coordinate data symbols is a merged data symbol, each merged data symbol being represented by said one or more data elements, and wherein each merged data symbol encodes at least one of said coordinate data symbols and at least one further data symbol which is different from said coordinate data symbol.

* * * * *